United States Patent
Inagaki et al.

(10) Patent No.: US 8,814,539 B2
(45) Date of Patent: Aug. 26, 2014

(54) HERMETIC COMPRESSOR

(75) Inventors: Ko Inagaki, Shiga (JP); Akira Nakano, Kyoto (JP); Yoshinori Ishida, Kyoto (JP); Ichiro Morita, Shiga (JP)

(73) Assignee: Panasonic Corporation, Osaka (JP)

( * ) Notice: Subject to any disclaimer, the term of this patent is extended or adjusted under 35 U.S.C. 154(b) by 538 days.

(21) Appl. No.: 12/936,588

(22) PCT Filed: May 8, 2009

(86) PCT No.: PCT/JP2009/002023
§ 371 (c)(1),
(2), (4) Date: Oct. 6, 2010

(87) PCT Pub. No.: WO2009/139135
PCT Pub. Date: Nov. 19, 2009

(65) Prior Publication Data
US 2011/0027111 A1 Feb. 3, 2011

(30) Foreign Application Priority Data

May 12, 2008 (JP) .................................. 2008-124324
May 12, 2008 (JP) .................................. 2008-124325

(51) Int. Cl.
F04B 39/02 (2006.01)
F04B 39/12 (2006.01)
F04B 53/16 (2006.01)
F04B 53/18 (2006.01)
F04B 39/00 (2006.01)
F04B 53/00 (2006.01)
F16J 1/08 (2006.01)

(52) U.S. Cl.
CPC ............ *F04B 39/0005* (2013.01); *F04B 53/008* (2013.01); *F04B 39/023* (2013.01); *F04B 39/122* (2013.01); *F04B 53/18* (2013.01); *F16J 1/08* (2013.01)
USPC .............................. 417/415; 92/158; 92/169.1

(58) Field of Classification Search
USPC ................................................ 92/158, 169.1
See application file for complete search history.

(56) References Cited

U.S. PATENT DOCUMENTS 3,489,130 A * 1/1970 Polidan et al. ............. 123/193.4
4,032,264 A 6/1977 Takahashi
(Continued)

FOREIGN PATENT DOCUMENTS

DE 236148 A1 5/1986
JP 2002-089450 A 3/2002
(Continued)

OTHER PUBLICATIONS

Examination Report for counterpart European Application No. 09746342.6, dated Jun. 7, 2011, 6 pages.

(Continued)

*Primary Examiner* — Bryan Lettman
(74) *Attorney, Agent, or Firm* — Brinks Gilson & Lione

(57) ABSTRACT

A hermetic compressor includes a closed vessel for storing lubricating oil, an electric-driving element, and a compressing element driven by the electric-driving element. The compressing element includes a cylinder block forming a compression chamber, a piton that reciprocates inside the compression chamber, and an oiling device for supplying the lubricating oil to an outer circumference of the piston. A first oil groove is concavely formed on the outer circumference of the piston, and a second oil groove is concavely formed on a side opposite to the compression chamber relative to the first oil groove. The second oil groove has a spatial volume same or greater than that of the first oil groove. An expanded clearance portion is provided such that a clearance between the piston and the cylindrical hole portion broadens from a top dead point to a bottom dead point.

11 Claims, 17 Drawing Sheets

(56) References Cited

U.S. PATENT DOCUMENTS

| | | | |
|---|---|---|---|
| 5,685,267 A * | 11/1997 | Wiczynski et al. | 123/197.3 |
| 5,816,134 A | 10/1998 | Takenaka et al. | |
| 7,175,400 B2 * | 2/2007 | Collings | 417/571 |
| 2006/0257274 A1 | 11/2006 | Umeoka et al. | |
| 2009/0101003 A1 | 4/2009 | Kim et al. | |
| 2009/0101442 A1 | 4/2009 | Katayama et al. | |

FOREIGN PATENT DOCUMENTS

| | | | |
|---|---|---|---|
| JP | 2003-065236 A | | 3/2003 |
| JP | 2005-307795 A | * | 4/2005 |
| JP | 2005-307795 A | | 11/2005 |
| WO | WO 94/24436 A1 | | 10/1994 |
| WO | WO 2005/116450 A1 | | 12/2005 |
| WO | WO 2006/064890 A1 | | 6/2006 |
| WO | WO 2006064890 A1 | * | 6/2006 |
| WO | WO 2007/009202 A1 | | 1/2007 |
| WO | WO 2007009202 A1 | * | 1/2007 |
| WO | WO 2009/051325 A1 | | 4/2009 |

OTHER PUBLICATIONS

International Search Report and Written Opinion of the International Searching Authority for International Application No. PCT/JP2009/002023, dated Oct. 23, 2009, 18 pages.

* cited by examiner

HERMETIC COMPRESSOR

This application is a 371 application of PCT/JP2009/002023 having an international application date of May 8, 2009, which claims priority to JP2008-124324 filed May 12, 2008 and JP2008-124325 filed May 12, 2008, the entire contents of which are incorporated herein by reference.

TECHNICAL FIELD

The present invention relates to hermetic compressors.

BACKGROUND ART

Attention to energy conservation and resource conservation has been increasingly enhanced recently from the viewpoint of global environmental protection. For example, reduction of power consumption is strongly demanded than ever before in a hermetic compressor employed in a freezing system, such as a refrigerator-freezer for household use. Methods of reducing power consumption by increasing efficiency of the hermetic compressor are described next. One is to reduce a sliding loss at sliding portions, typically a clearance between a piston and cylinder, and a clearance between a main shaft and bearing. Another method is to reduce a loss of refrigerant leakage due to leakage of high-pressure refrigerant from a compression chamber to other part via the clearance between the piston and cylinder during compression of the refrigerant.

A method of reducing sliding loss between the piston and cylinder and also reducing a loss of refrigerant leakage via the clearance between the piston and cylinder is disclosed. In this method, a cylinder is a conic trapezoid whose inner diameter increases from a top dead point to bottom dead point. (For example, refer to PTL1).

The above conventional hermetic compressor is described below with reference to drawings.

FIG. 17 is a vertical sectional view of the conventional hermetic compressor described in PTL1. FIG. 18 is a sectional view of a key part around the piston of the conventional hermetic compressor.

Electric-driving element 5 is provided at a bottom part inside closed vessel 1. Compressing element 6 is provided at an upper part inside closed vessel 1. Compressing element 6 is driven via main shaft 9. Rotor 4 of electric-driving element 5 is directly connected to main shaft 9. Compressing element 6 converts the rotation of eccentric shaft 10 to the reciprocating movement of piston 19 via connecting device 20. As a result, piston 19 reciprocates inside cylinder 16. Eccentric shaft 10 is provided on main shaft 9.

Lubricating oil 7 is stored at the bottom of closed vessel 1. This lubricating oil 7 is stored for lubricating a sliding portion, i.e., main shaft 9 and main bearing 18 of compressing element 6. Centrifugal pump 11 provided at a bottom end of main shaft 9 pumps up lubricating oil 7, and supplies it first to the sliding portion of main bearing 18, and then to eccentric shaft 10 at the upper part via viscous pump 12 provided on main shaft 9.

Lubricating oil 7 supplied to eccentric shaft 10 is led to the outer diameter of eccentric shaft 10 so as to lubricate the sliding portion of connecting device 20, and then is dispersed around from end. A part of this dispersed lubricating oil 7 lubricates the sliding portion between an outer circumference of piston 19 in reciprocating movement and an inner circumference of cylinder 16, and also provides an oil seal to a clearance of this sliding portion.

Cylinder 16 is conic trapezoid whose inner diameter increases from dimension Dt to dimension Db from the top dead point to the bottom dead point. Piston 19 is a cylindrical shape, whose outer diameter is the same over the entire length.

In these shapes, a pressure inside compression chamber 17 is not so much increased to the midway of a compression stroke while piston 19 moves from the bottom dead point to the top dead point where refrigerant gas (not illustrated) is compressed. Therefore, the oil-seal effect by lubricating oil 7 scarcely leaks refrigerant even if clearance Cb between piston 19 and cylinder 16 is relatively large. In addition, relatively large clearance Cb generates only a small sliding resistance of piston 19.

Then, when the compression stroke further advances to increase the refrigerant gas pressure inside compression chamber 17 and piston 19 reaches near the top dead point, the pressure inside compression chamber 17 increases up to a predetermined discharge pressure and becomes high temperature and high pressure. This degrades viscosity of lubricating oil 7, and establishes a condition that may allow leakage of refrigerant. However, since clearance Ct between piston 19 and cylinder 16 becomes small at the side of top dead point, the oil-seal effect of lubricating oil 7 works, and reduces leakage of refrigerant. Accordingly, high compression efficiency can be maintained.

Another example of the prior art is provided with a lubrication groove on an outer circumference of the piston so as to encourage feeding of lubricating oil between the piston and cylinder. This increases the oil-seal effect in the clearance between the piston and cylinder. Accordingly, leakage of compressed refrigerant gas between the piston and cylinder via the clearance is reduced, increasing the efficiency of hermetic compressor. (For example, refer to PTL2.)

The above conventional hermetic compressor is described below with reference to drawings.

FIG. 19 is a vertical sectional view of the conventional hermetic compressor disclosed in PTL2. FIG. 20 is the hermetic compressor seen from the direction of arrow A in FIG. 19. FIG. 21 is a sectional view of a key part around the piston of the conventional hermetic compressor disclosed in PTL2.

In FIGS. 19 to 21, electric-driving element 35 and compressing element 36 are disposed in closed-vessel space 32 inside closed vessel 31. Lubricating oil 37 is stored at a bottom part of closed vessel 31. Electric-driving element 35 includes stator 33 and rotor 34 with built-in permanent magnet (not illustrated). Compressing element 36 is driven by electric-driving element 35.

Shaft 38 includes main shaft 39 and eccentric shaft 40. Oiling device 38a includes centrifugal pump 41, vertical hole 43, and horizontal hole 44. Rotor 34 is press-fitted into main shaft 39. Eccentric shaft 40 is formed eccentric to main shaft 39. Oiling device 38a is formed on shaft 38. One end of centrifugal pump 41 is open submerged in lubricating oil 37, and the other end is connected to viscous pump 42. Vertical hole 43 and horizontal hole 44 are provided at opposite sides relative to viscous pump 42, and are open to closed-vessel space 32.

Block 45 includes cylinder 46 and main bearing 48. Piston 49 is reciprocatably inserted to cylinder 46. There are two ring-like oil grooves 51 on the outer circumference of piston 49. Cylinder 46 forms substantially cylindrical compression chamber 47. Main bearing 48 supports main shaft 39. Connecting device 50 couples piston 49 and eccentric shaft 40.

Oil groove 51 is located on an inner circumference of cylinder 46 at a top dead point (top end face 49a of piston is at arrow B), and is connected to closed-vessel space 32 via notched portion 52 at a bottom dead point (top end face 49a of piston is at arrow C).

The operation of the hermetic compressor as configured above is described next.

Rotor 34 of electric-driving element 35 rotates shaft 38, and the rotation of eccentric shaft 40 is transmitted to piston 49 via connecting device 50. This makes piston 49 reciprocate in compression chamber 47. Refrigerant gas from a cooling system (not illustrated) is sucked into compression chamber 47, compressed, and then discharged to the cooling system again. This compression movement is repeated.

While the hermetic compressor is operated, lubricating oil 37 in centrifugal pump 41 is pumped up by the centrifugal force generated by the rotation of shaft 38. Then, through viscous pump 42, lubricating oil 37 is supplied to each sliding portion. Then, lubricating oil 37 is released from vertical hole 43 and horizontal hole 44, and dispersed to closed-vessel space 32. At this point, lubricating oil 37 dispersed through release passage K reaches the top part of piston 49 located at notched portion 52. Then, oil reservoir 37a is formed on piston 49 at a top part of oil groove 51 by surface tension.

Lubricating oil 37 in oil reservoir 37a flows to the entire circumference of oil groove 51 so as to improve the seal effect between piston 49 and cylinder 46 for reducing leakage loss.

However, in the conventional structure disclosed in above PTL1, the clearance between piston 19 and cylinder 16 is conic trapezoid. This makes spatial volume of clearance larger than when the clearance between piston 19 and cylinder 16 is cylindrical. As a result, when the refrigerant gas is compressed to high pressure and reaches a predetermined pressure, lubricating oil 7 in the clearance may be easily blown into closed-vessel space 2 by high-pressure refrigerant. Therefore, lubricating oil 7 needs to be sufficiently and reliably fed to the clearance between piston 19 and cylinder 16 in order to reduce the leakage loss of refrigerant.

In the conventional structure disclosed in above PTL2, lubricating oil 37 can be reliably fed near to the top dead point of piston 49 by providing oil groove 51 on the outer circumference of piston 49. However, conic trapezoidal inner diameter of cylinder 46 increases the spatial volume of clearance, compared to that of tubular cylinder 46. To increase the oil amount of lubricating oil 37 to be supplied, a capacity of oil groove 51 needs to be enlarged.

However, in a state that refrigerant gas is at high temperature and high pressure in compression chamber 47 near the top dead point of piston 49, lubricating oil 37 carried through oil groove 51 is carried out to the clearance between piston 49 and cylinder 46. Refrigerant gas then flows into the space of oil groove 51, and the space thus becomes a dead volume. Accordingly, reexpansion loss may increase if the capacity of oil groove 51 is increased.

Taking into account that oil groove 51 becomes a dead volume after the refrigerant gas is carried out, it is necessary to secure sufficient oil amount while suppressing the dead volume.

FIG. 22 is a sectional view of a compressor unit, in which refrigerant can be compressed, disclosed in PTL3.

Cylindrical hole portion 66 of cylinder 64, includes expanded clearance portion 67 and uniform clearance portion 68. Piston end 73 has the uniform outer diameter over the entire length. Expanded clearance portion 67 has inner diameter that increases from Dt to Db (>Dt) from the side of the top dead point toward the bottom dead point of piston 75. Uniform clearance portion 68 has a fixed inner diameter in the axial direction, and is formed only for length L at an area corresponding to an end of piston 73 reaching the top dead point to the side of compression chamber 65.

Blowby, which is leakage of high-temperature and high-pressure refrigerant gas compressed in the compression chamber, scarcely occurs up to a midway of a compression stroke before piston 75 reaches near the top dead point by provision of this expanded clearance portion 67 and uniform clearance portion 68 via connecting device 76. In addition, the sliding resistance of piston 75 reduces. In a state that the compression stroke further advances, and piston 75 comes close to the top dead point, leakage of refrigerant gas in line with increased gas pressure can be reduced, compared to the case of forming the expanded clearance portion over the entire length.

However, in the compressor unit with the conventional structure disclosed in PTL3, the entire piston 75 remains inside cylindrical hole portion 66 even when piston 75 returns to the bottom dead point. Accordingly, the lubricating oil may not be sufficiently supplied between cylindrical hole portion 66 and piston 75 where lubrication is needed.

In addition, in the compressor unit with the conventional structure disclosed in PTL3, the lubricating oil is pushed out when the clearance becomes narrower as piston 75 comes close to the top dead point. When piston 75 returns to the bottom dead point and the clearance becomes broader, the lubricating oil for sealing the clearance is insufficient. This makes it difficult to suppress blowby. Insufficient lubricating oil also increases the sliding resistance.

CITATION LIST

Patent Literature

[PTL 1] Japanese Patent Unexamined Publication No. 2002-89450
[PTL 2] Japanese Patent Unexamined Publication No. 2005-307795
[PTL 3] Japanese Translation of PCT Publication H7 550833H7-508333

SUMMARY OF THE INVENTION

A hermetic compressor of the present invention includes a closed vessel storing lubricating oil, an electric-driving element, and a compressing element driven by the electric-driving element. The compressing element includes a cylinder block forming a compression chamber, a piston that reciprocates in the compression chamber, and an oiling device for feeding lubricating oil to an outer circumference of the piston. The piston has a first oil groove concavely formed on its outer circumference, and a second oil groove, concavely formed, having a spatial volume same or larger than the first oil groove. An expanded clearance portion is provided, and a clearance between the piston and cylinder block in this portion broadens from a top dead point to a bottom dead point.

In this hermetic compressor, the expanded clearance portion broadens the clearance between the piston and cylinder, resulting in reducing a viscous resistance. The sum of volumes of the first oil groove and the second oil groove enables reliable feeding of an amount of lubricating oil needed for reliably applying an oil seal to the broadening clearance between the piston and cylinder from the top dead point to the bottom dead point. In addition, the volume of the first oil groove not greater than that of the second oil groove suppresses amount of refrigerant gas flowing in from the compression chamber to the first oil groove during compression of refrigerant.

DETAILED DESCRIPTION OF THE PREFERRED EMBODIMENTS

Exemplary embodiments of the present invention are described below with reference to drawings.

Example 1

Figure 1:
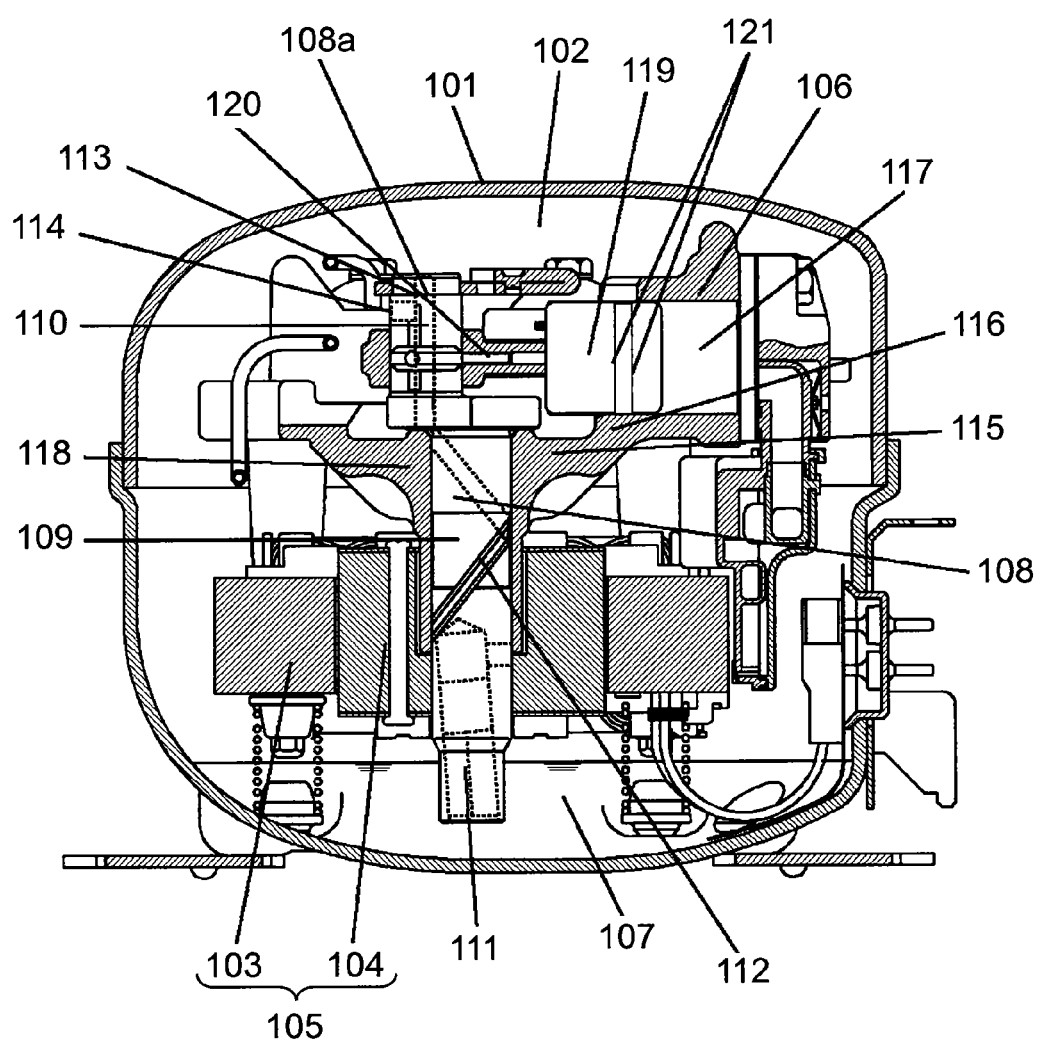
FIG. 1 is a vertical sectional view of a hermetic compressor in accordance with a first exemplary embodiment of the present invention.
Figure 2:
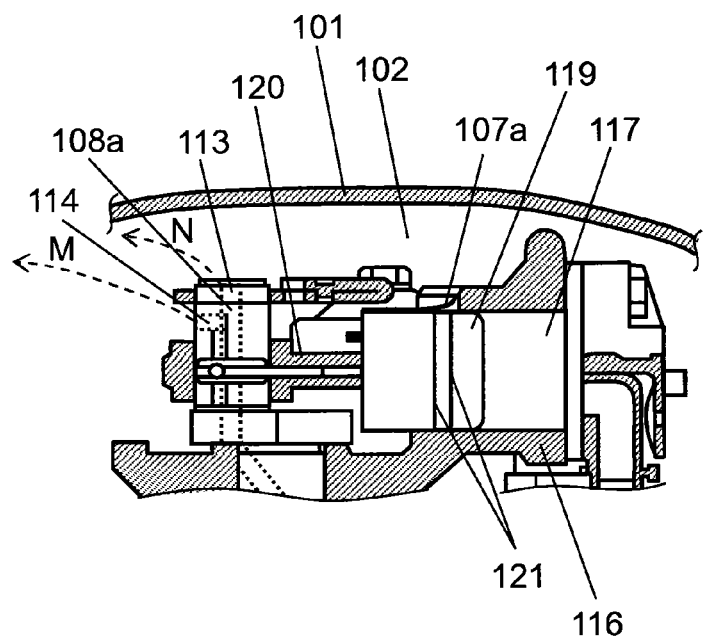
FIG. 2 is a sectional view of a key part around a piston of the hermetic compressor in a state that the piston is at a bottom dead point.
Figure 3:
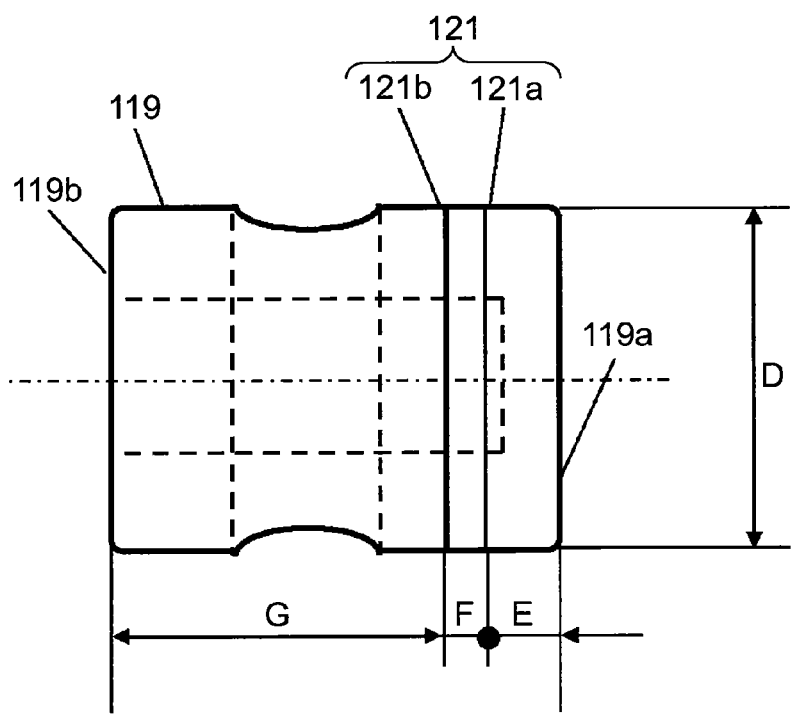
FIG. 3 is a magnified view of the piston of the hermetic compressor.

FIG. 1 is a vertical sectional view of a hermetic compressor in the first exemplary embodiment of the present invention. FIG. 2 is a sectional view of a key part around a piston of the hermetic compressor when the piston is at a bottom dead point. FIG. 3 is a magnified view of the piston of the hermetic compressor.

In FIGS. 1 to 3, the hermetic compressor includes electric-driving element 105 and compressing element 106 in closed-vessel space 102 inside closed vessel 101. Lubricating oil 107 is stored at the bottom of closed vessel 101.

Refrigerant in closed-vessel space 102 is R600a. R600a is hydrocarbon refrigerant, which is a typical natural refrigerant with a low global warming potential.

Electric-driving element 105 includes stator 103 and rotor 104 with a built-in permanent magnet (not illustrated). Compressing element 106 is driven by electric-driving element 105.

Compressing element 106 includes shaft 108, cylinder block 115, piston 119, and oiling device 108a.

Rotor 104 is press-fitted to shaft 108. Shaft 108 includes main shaft 109 and eccentric shaft 110. Eccentric shaft 110 is disposed eccentric to main shaft 109.

Oiling device 108a includes centrifugal pump 111, viscous pump 112, and a sequence of passages established by vertical hole 113 and horizontal hole 114. Oiling device 108a is formed on shaft 108. One end of centrifugal pump 111 is open submerged in lubricating oil 107, and the other end is connected to the bottom end of viscous pump 112. One end of each of vertical hole 113 and horizontal hole 114 is connected to the top end of viscous pump 112, and the other end is open to closed-vessel space 102.

Cylinder block 115 includes cylindrical hole portion 116 and main bearing 118. Main bearing 118 supports main shaft 109.

Piston 119 is slidably inserted into cylindrical hole portion 116 in a reciprocating manner, and piston 119 reciprocates in cylindrical hole portion 116.

Compression chamber 117 is a space surrounded by cylindrical hole portion 116 and an end face of piston 119. Connecting device 120 couples piston 119 and eccentric shaft 110.

Multiple oil grooves 121 are provided on an outer circumference of piston 119. More specifically, oiling device 108a feeds lubricating oil 107 to the outer circumference of piston 119. As shown in FIG. 2, closed-vessel space 102 and a part of oil grooves 121 are connected at a bottom dead point of piston 119. At other positions, for example, near the top dead point, entire oil grooves 121 come inside cylindrical hole portion 116. Accordingly, in the reciprocating motion of piston 119, at least a part of oil grooves 121 may be located in closed-vessel space 102 outside cylindrical hole portion 116 at one time, and inside cylindrical hole portion 116 at another time.

Cylindrical hole portion 116 has uniform clearance portion 130 where a clearance between piston 119 and cylindrical hole portion 116 is uniform in a predetermined area corresponding to an area at a top end of piston 119 to the side of compression chamber 117 from the top dead point to the bottom dead point.

Consequently, the percentage of uniform clearance 130 in the clearance between piston 119 and cylindrical hole portion 116 is increased as a pressure of refrigerant gas inside compression chamber 117 becomes a predetermined pressure or higher. This enables reduction of leakage loss of refrigerant gas.

Expanded clearance portion 131, in which an inner diameter of cylindrical hole portion 116 broadens toward the bottom dead point, is provided to the side of bottom dead point relative to uniform clearance portion 130.

More specifically, when piston 119 is at the top dead point, piston 119 contacts uniform clearance portion 130. Uniform clearance portion 130 and expanded clearance portion are adjacent to each other. Uniform clearance portion 130 is formed on a part corresponding to the top end of piston 119 to the side of compression chamber, and the inner diameter of compression chamber 117 is uniform in the axial direction. Expanded clearance portion 131 is adjacent to uniform clearance portion 130, and is formed such that the inner diameter of cylindrical hole portion 116 broadens from the side of the top dead point to the bottom dead point of piston 119. Uniform clearance portion 130 is located to the side of the top dead point relative to expanded clearance portion 131.

When piston 119 is close to the bottom dead point and pressure of the refrigerant gas inside compression chamber 117 is low, a viscous resistance of the clearance between piston 119 and cylindrical hole portion 116 reduces in expanded clearance portion 131. When piston 119 is close to the top dead point and the pressure of refrigerant gas inside compression chamber 117 is high, uniform clearance portion 130 maintains constant clearance between piston 119 and cylindrical hole portion 116. This suppresses leakage of refrigerant gas from compression chamber 117 to closed vessel 101, reducing leakage loss.

In expanded clearance portion 131, the outer diameter of piston 119 may be reduced from the side of the top dead point to the bottom dead point.

In uniform clearance portion 130, a change in the inner diameter of cylindrical hole portion 116 from end 116a to the side of the top dead point of cylindrical hole portion 116 is equivalent to an inner-diameter shape of the cylindrical hole portion in a conventional hermetic compressor. In other words, the change in the inner diameter of cylindrical hole portion 116 is approximately around 0.01%. An area where the inner diameter of cylindrical hole portion 116 broadens toward the bottom dead point at a change rate greater than that (0.01%) in uniform clearance portion 130 is expanded clearance portion 131.

Figure 4:
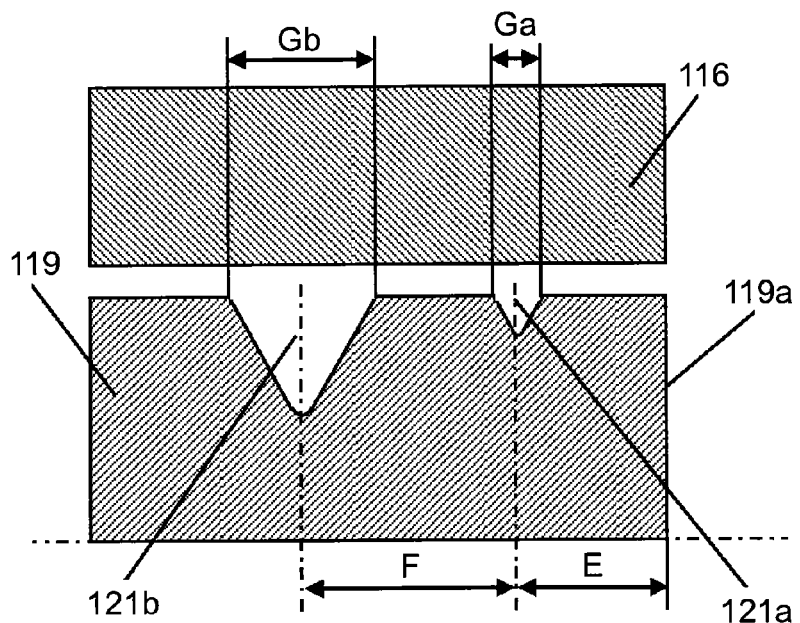
FIG. 4 is a magnified view around an oil groove in the hermetic compressor.

FIG. 4 is a magnified view of a state that the piston of the hermetic compressor in the first exemplary embodiment of the present invention is at the bottom dead point.

There are two oil grooves 121. First oil groove 121a is provided to the side of top end face 119a of piston 119, relative to piston 119, with total length D, at distance E from top end face 119a. Second oil groove 121b is formed at distance F from first oil groove 121a. In other words, different second oil groove 121b is provided to the side of bottom end face 119b of piston 119 relative to first oil groove 121a. Accordingly, first oil groove 121a and second oil groove 121b are concavely formed on the outer circumference of piston 119. Second oil groove 121b is provided to the opposite side of compression chamber 117 relative to first oil groove 121a.

First oil groove 121a to the side of top end face 119a of piston 119 is formed such that its spatial volume is smaller than that of second oil groove 121b to the side of bottom end face 119b. A ratio of the spatial volume of first oil groove 121a to the spatial volume of second oil groove 121b mostly conforms to a ratio of the spatial volume of first clearance to the spatial volume of second clearance described next. The spatial volume of the first clearance is a capacity between piston 119 and cylindrical hole portion 116 for distance F from first oil groove 121a to second oil groove 121b. The spatial volume of the second clearance is a capacity between piston 119 and cylindrical hole portion 116 for distance G from second oil groove 121b to bottom end face 119b.

The sum of spatial volumes of first oil groove 121a and second oil groove 121b is designed to be equivalent to the spatial volume of the clearance between piston 119 and cylindrical hole portion 116. A cross-section of first oil groove 121a and second oil groove 121b is substantially equilateral-triangle with substantially round bottom.

The spatial volume of groove is a capacity of space in a groove surrounded by an extended face of the outer circumference of piston 119.

In the first exemplary embodiment, the diameter of piston 119 is 25 mm, total length D of piston 119 is 23 mm, distance E from top end face 119a of piston 119 to first oil groove 121a is 4 mm, distance F between first oil groove 121a and second oil groove is 4 mm, and distance G from second oil groove 121b to bottom end face 119a is 17 mm.

Groove width Ga of first oil groove 121 is 150 micro meters, and groove width Gb of second oil groove 121b is 700 micro meters. Since the spatial volume of the clearance is around 18 mm$^3$, the spatial volume of first oil groove 121a is set to about 1 mm$^3$ and the spatial volume of second oil groove 121b is set to 17 mm$^3$.

Uniform clearance portion 130 is provided for about 10 mm from the top dead point of cylindrical hole portion 116. Clearance Ct between piston 119 and cylindrical hole portion 116 in uniform clearance portion 130 is 10 micro meters. Clearance Cb in expanded clearance portion 131 toward the bottom dead point is 30 micro meter.

Notched portion 122 is provided on a top wall of cylindrical hole portion 116 in cylinder block 115. First oil groove 121a and second oil groove 121b are connected to inside closed vessel 101 via this notched portion 122 near the bottom dead point of piston 119.

The operation of the hermetic compressor as configured above is described below.

Rotor 104 of electric-driving element 105 rotates shaft 108. The rotation of eccentric shaft 110 is transmitted to piston 119 via connecting device 120. As a result, piston 119 reciprocates in cylindrical hole portion 116. This makes refrigerant gas from a cooling system (not illustrated) drawn into compression chamber 117. After compression, refrigerant gas is discharged to the cooling system again. This compressing operation is repeated.

When the hermetic compressor is operated, lubricating oil 107 in centrifugal pump 111 of oiling device 108a is pumped up by the centrifugal force generated by the rotation of shaft 108. This lubricating oil 107 is fed to each sliding portion via viscous pump 112. Then, lubricating oil 107 is discharged to the entire circumference of closed-vessel space 102, indicated by discharge passages M and N, through vertical hole 113 and horizontal hole 114. Lubricating oil 107 discharged at this point is dispersed also to the top part of piston 119 exposed in closed-vessel space 102 from notched portion 112. Therefore, oil reservoir 107a is formed, typically by the surface tension, on the top part of oil grooves 121 on piston 119.

Figure 5:
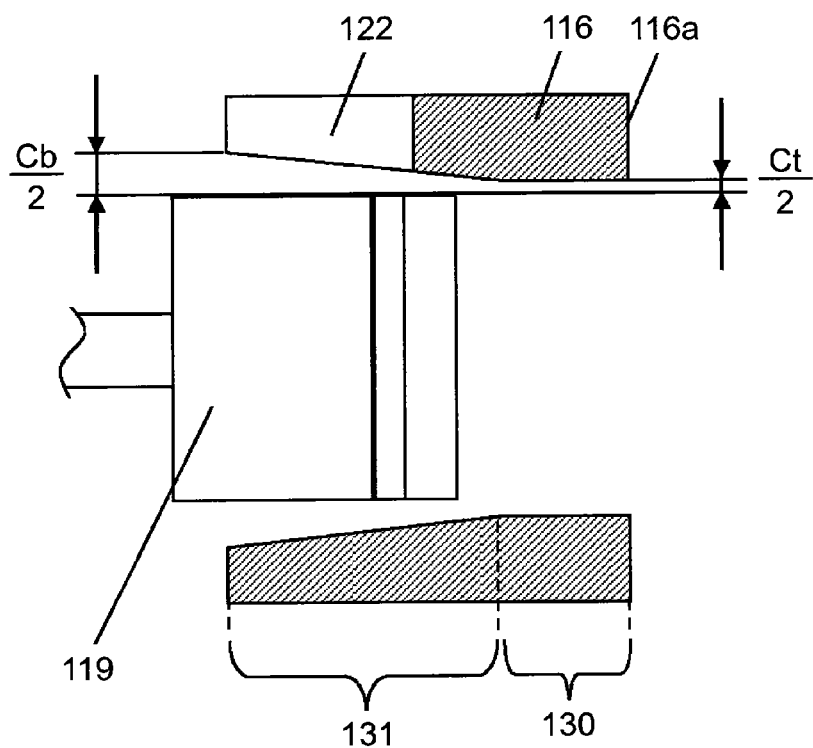
FIG. 5 is a magnified view of the piston at the bottom dead point.

FIG. 5 is a magnified view around the oil groove in the hermetic compressor in the first exemplary embodiment.

When piston 119 is at near the bottom dead point, first oil groove 121a and second oil groove 121b are located outside of cylindrical hole portion 116 via notched portion 122. Therefore, lubricating oil 107 in oil reservoir 107a is fed to the entire circumference of first oil groove 121a and second oil groove 121b by capillary action. Here, piston 119 is located at expanded clearance portion 131 of cylindrical hole portion 116.

When piston 119 starts its compression stroke from the bottom dead point to the top dead point, lubricating oil 107 stored in first oil groove 121*a* and second oil groove 121*b* is carried to the clearance between piston 119 and cylindrical hole portion 116.

Figure 6:
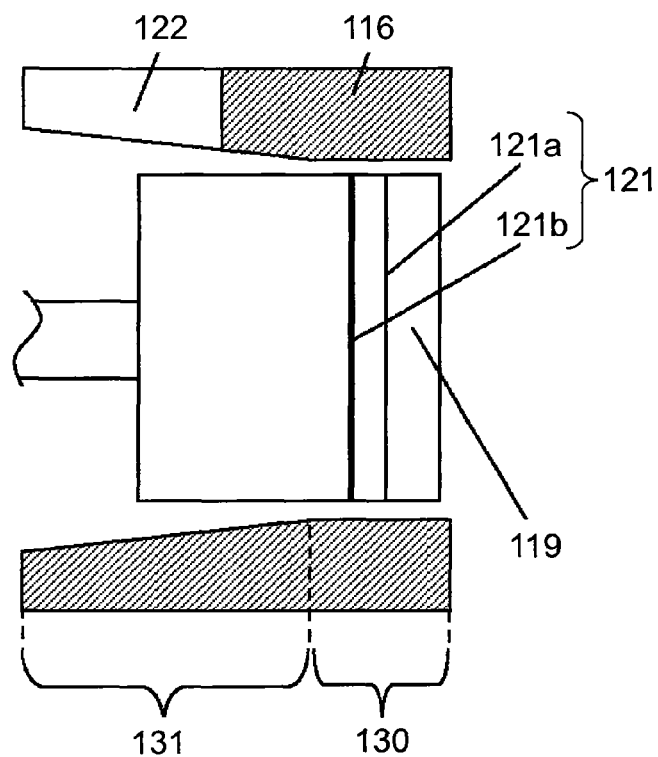
FIG. 6 is a magnified view of the piston at a top dead point in the hermetic compressor.

FIG. 6 is a magnified view of the hermetic compressor in the first exemplary embodiment in a state that its piston is at the top dead point.

When piston 119 reaches near the top dead point, first oil groove 121*a* and second oil groove 121*b* are located at uniform clearance portion 130 of cylindrical hole portion 116, and thus lubricating oil 107 is fed to uniform clearance portion.

Then, piston 119 starts the intake stroke traveling back to the bottom dead point, and repeats the above movement.

An action and effect of the structure and operation in the first exemplary embodiment of the present invention is described below.

First, when piston 119 is close to the bottom dead point, piston 119 is located at expanded clearance portion 131. Therefore, the clearance between piston 119 and cylindrical hole portion 116 is relatively broad. Accordingly a viscous resistance is small by lubricating oil 107. This suppresses the sliding loss at a low level.

At this point, first oil groove 121*a* and second oil groove 121*b* concavely formed on the outer circumference of piston 119 are located at oil reservoir 107*a* at notched portion 122. Therefore, sufficient lubricating oil 107 for feeding to the clearance between piston 119 and cylindrical hole portion 116 can be secured.

Next, in the compression stroke, the piston starts to move toward the top dead point. Feeding of lubricating oil 107 stored in first oil groove 121*a* and second oil groove 121*b* to the clearance between piston 119 and cylindrical hole portion 116 retains preferable lubricated sliding of piston 119.

As piston 119 moves toward the top dead point, the clearance between piston 119 and cylindrical hole portion 116 at expanded clearance portion gradually narrows. However, since the clearance is broader than that of general substantially tubular cylindrical hole portion 116, the sliding loss can be suppressed at a low level.

Figure 7:
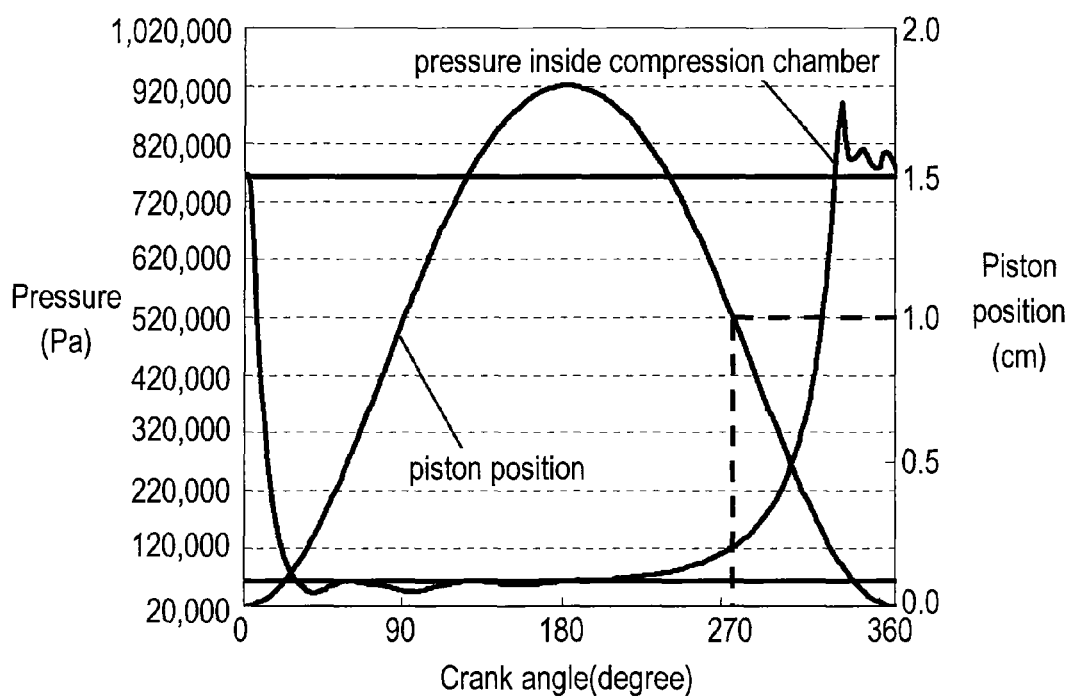
FIG. 7 illustrates the relationship of a piston position and a pressure inside a compression chamber in the hermetic compressor.

FIG. 7 illustrates the relationship between the piston position and pressure inside the compression chamber of the hermetic compressor in the first exemplary embodiment.

As piston 119 comes close to the top dead point, pressure of refrigerant gas inside compression chamber 117 gradually increases. As shown in FIG. 7, the pressure of refrigerant gas inside compression chamber 117 is not so obviously high until a crank angle reaches around 270 degree. Therefore, the oil seal effect of lubricating oil 107 fed between piston 119 and cylindrical hole portion 116 is retained while piston 119 is located at expanded clearance portion 131. Accordingly, no refrigerant gas in compression chamber 117 leaks out to closed-vessel space 102.

When the crank angle exceeds around 270 degree, top end face 119*a* of piston 119 reaches uniform clearance portion 130. Then, the clearance between piston 119 and cylindrical hole portion 116 starts to be the narrowest, and at the crank angle of 360 degree, i.e., piston 119 reaching the top dead point, the sliding loss between piston 119 and cylindrical hole portion 116 becomes the greatest.

However, when piston 119 reaches the top dead point, first oil groove 121*a* and second oil groove 121*b*, which are concavely formed on piston 119, are located at uniform clearance portion 130. Therefore, lubricating oil 107 is reliably supplied to uniform clearance portion 130 where the sliding loss becomes the greatest. Preferable lubricated sliding is thus retained, and an increase in sliding loss can be slightly suppressed.

On the other hand, when the crank angle exceeds 270 degree and pressure of refrigerant gas in compression chamber 117 becomes high, lubricating oil 107 supplied between piston 119 and cylindrical hole portion 116 starts to be blown off to closed-vessel space 102. The refrigerant gas thus reaches close to first oil groove 121*a* via the clearance between piston 119 and cylindrical hole portion 116.

The refrigerant gas reaching first oil groove 121*a* flows into first oil groove 121*a*, and forms multiple small swirls by being mixed with lubricating oil 107 in first oil groove 121*a*. Lubricating oil 107 is then carried out to the clearance between piston 119 and cylindrical hole portion 116.

Lubricating oil 107 carried out from first oil groove 121*a* reaches second oil groove 121*b* while applying oil seal to the clearance between piston 119 and cylindrical hole portion 116, and is supplied to second oil groove 121*b*. Here, the clearance between piston 119 and cylindrical hole portion 116 continues from first oil groove 121*a* to second oil groove 121*b*.

Since distance of 1 mm or more to 4 mm or less is secured between first oil groove 121*a* and second oil groove 121*b*, an oil-seal distance is secured by lubricating oil 107 carried out from first oil groove 121*a*, and the amount of refrigerant gas reaching second oil groove 121*b* is reduced.

Lubricating oil 107 in second oil groove 121*b* is also carried out between piston 119 and cylindrical hole portion 116, same as first oil groove 121*a*. However, continuous feeding of lubricating oil 107 from first oil groove 121*a* enables continuous oil seal of the outer circumference of piston 119 from second oil groove 121*b* to bottom end face 119*b* of piston 119.

When piston 119 reaches the top dead point, lubricating oil 107 in first oil groove 121*a* is carried out. The spatial volume of first oil groove 121*a* becomes a dead volume where the refrigerant gas flows in. This causes reexapansion loss. However, the spatial volume of first oil groove 121*a* is designed to be extremely smaller than the spatial volume of second oil groove 121*b* so as to suppress reexpansion loss at a low level. Accordingly, the efficiency of the hermetic compressor can be further increased, compared to that having equivalent spatial volume for first oil groove 121*a* and second oil groove 121*b*.

In addition, lubricating oil 107 retained in first oil groove 121*a* and lubricating oil 107 retained in second oil groove 121*b* are carried out to the clearance formed between piston 119 and cylindrical hole portion 116 so as to generate the oil-seal effect. Accordingly, it can be estimated that the sum of spatial volume of first oil groove 121*a* and the spatial volume of second oil groove 121*b* is correlated with the sum of spatial volume of the clearance formed between piston 119 and cylindrical hole portion 116.

Figure 8:
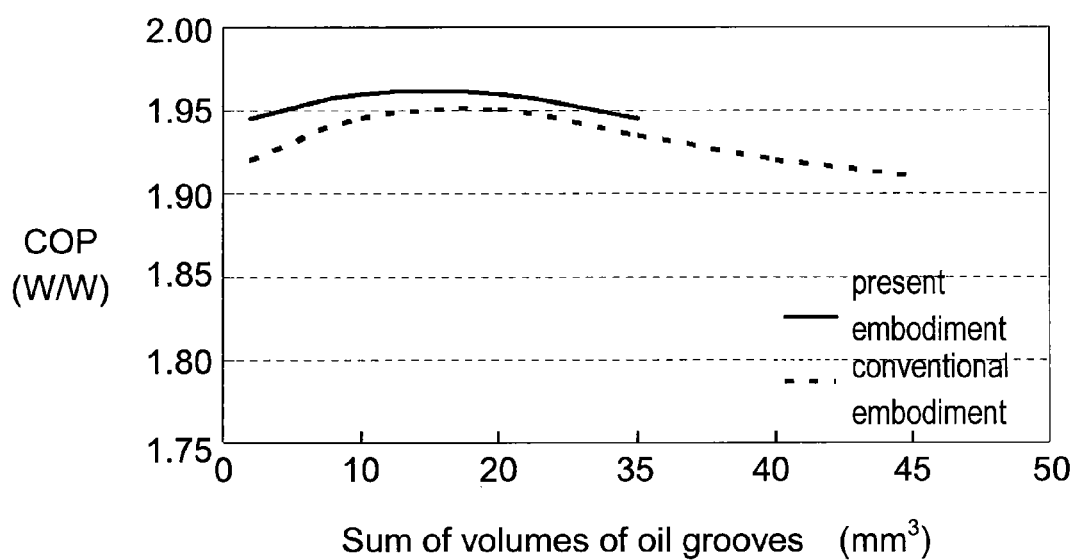
FIG. 8 illustrates the relationship of a sum of volumes of the oil grooves in the hermetic compressor and a coefficient of performance.

FIG. 8 illustrates the relationship of the sum of volumes of oil grooves and a coefficient of performance in the first exemplary embodiment of the present invention. Results of confirmatory experiments are described below with reference to FIG. 8.

FIG. 8 illustrates the relationship of the sum of spatial volumes of first oil groove 121*a* and second oil groove 121*b* and the coefficient of performance (COP). The COP is a ratio of freezing capacity to applied input, and is generally used as an index for expressing the efficiency. A vertical axis is the COP of hermetic compressor, and a horizontal axis is the sum of spatial volumes of first oil groove 121*a* and second oil groove 121*b* concavely formed on piston 119.

Characteristic (dotted line) of the prior art shown in the drawing is a result when the spatial volume of first oil groove 121*a* and the spatial volume of second oil groove 121*b*, concavely formed on piston 119, are the same. The characteristic (solid line) of the first exemplary embodiment of the present invention is a result when the spatial volume of second oil groove 121b is 17 times the spatial volume of first oil groove 121a.

The spatial volume of second oil groove 121b is preferably set to 4 to 20 times the spatial volume of first oil groove 121a. In this range of volume ratio, lubricating oil 107 can be supplied in good balance from first oil groove 121a and second oil groove 121b to the oil-seal distance formed by the clearance between piston 119 and cylindrical hole portion 116 that continues toward the bottom dead point.

Experiment conditions are set to evaporative temperature of −30 centigrade and condensing temperature of 40 centigrade, which is close to temperature conditions at which a refrigerator is operated. The operating frequency is the frequency of commercial power supply.

As shown in FIG. 8, it can be confirmed that both prior art and the first exemplary embodiment demonstrate high COP when the sum spatial volumes of first oil groove 121a and second oil groove 121b is 10 mm$^3$ or more to 35 mm$^3$ or less, whereas the spatial volume of clearance between piston 119 and cylindrical hole portion 116 is 18 mm$^3$. Still more, compared to the prior art, the first exemplary embodiment of the present invention achieves higher COP.

The above experiment results are studied below.

If the sum of spatial volumes of first oil groove 121a and second oil groove 121b exceeds 35 mm$^3$, the sum of spatial volumes of first oil groove 121a and second oil groove 121b becomes too large, compared to the spatial volume of the clearance between piston 119 and cylindrical hole portion 116. Therefore, although lubricating oil 107 to be fed to the clearance is sufficiently secured, the refrigerant gas leaked out between piston 119 and cylindrical hole portion 116 from compression chamber 117, after lubricating oil 107 is carried out from first oil groove 121a, flows into first oil groove 121a. This increases the reexpansion loss. As a result, the compression efficiency decreases and the COP drops.

On the other hand, if the sum of spatial volumes of first oil groove 121a and second oil groove 121b becomes less than 10 mm$^3$, the COP drops, and also variations in COP increase. This is because lubricating oil 107 that applies oil seal is not sufficiently supplied between piston 119 and cylindrical hole portion 116 due to extremely small sum of spatial volumes of first oil groove 121a and second oil groove 121b. The oil-seal effect is thus estimated to be reduced.

Accordingly, as described in the first exemplary embodiment, leakage of refrigerant gas can be suppressed most efficiently when the sum of spatial volumes of first oil groove 121a and second oil groove 121b is set to 0.5 to 2.0 times the spatial volume of the clearance between piston 119 and cylindrical hole portion 116. This is believed to suppress best leakage of refrigerant gas and increase the efficiency of the hermetic compressor.

Compared to the prior art, the COP in the first exemplary embodiment of the present invention further increases due to the next point. The ratio of the spatial volume of first oil groove 121a to that of second oil groove 121b is almost the same as the ratio of spatial volumes of the first to second clearance. This enables application of oil seal to distance F in the spatial volume of clearance between piston 119 and cylindrical hole portion 116 in just proportion by lubricating oil 107 carried out from first oil groove 121a. In addition, lubricating oil 107 carried out from second oil groove 121b applies oil seal to distance G in the spatial volume of clearance between piston 119 and cylindrical hole portion 116 in just proportion. The spatial volume of the first clearance is between piston 119 and cylindrical hole portion 116 at distance F from first oil groove 121a to second oil groove 121b. The spatial volume of second clearance is between piston 119 and cylindrical hole portion 116 at distance G from second oil groove 121b to bottom end face 119b.

Furthermore, the spatial volume of first oil groove 121a is smaller than the spatial volume of second oil groove 121b. This reduces reexpansion loss due to refrigerant gas flowing in after lubricating oil 107 is carried out from first oil groove 121a. Accordingly, the efficiency of hermetic compressor can be further increased compared to that with the same spatial volume for first oil groove 121a and second oil groove 121b.

In summary, the sum of spatial volumes of first oil groove 121a and second oil groove 121b is preferably 0.5 or more to 2.0 or less times the spatial volume of clearance between piston 119 and cylindrical hole portion 116.

In addition, the spatial volume of second oil groove 121b is designed to be larger than the spatial volume of first oil groove. A ratio of the spatial volume of first oil groove 121a to that of second oil groove 121b is about the same as a ratio of spatial volume of clearance at distance F to distance G between piston 119 and cylindrical hole portion 116. This achieves the largest effect of improving the COP. Distance F is a distance from first oil groove 121a to second oil groove 121b. Distance G is a distance from second oil groove 121b to bottom end face 119b. In other words, the spatial volume of second oil groove 121b is preferably 4 to 20 times the spatial volume of first oil groove 121a.

In the first exemplary embodiment, R600a is used as the refrigerant. However, to gain the freezing capacity about the same as that using R134a as refrigerant, about doubled cylinder volume is needed in the hermetic compressor using R600a, compared to that using R134a, due to a difference in property of both refrigerants. Therefore, the outer diameter and stroke of piston 119 are made larger compared to the case of using R134a.

In general, the spatial volume of clearance between piston 119 and cylindrical hole portion 116 increases by enlarging the outer diameter of piston 119, and thus leakage of refrigerant gas from compression chamber 117 increases.

However, in the hermetic compressor in the first exemplary embodiment of the present invention, first oil groove 121a and second oil groove 121b created in piston 119 act to improve the stability of oil seal between piston 119 and cylindrical hole portion 116. Therefore, this structure achieves significant effect, in particular, in the hermetic compressor using R600a as refrigerant.

Also in the first exemplary embodiment of the present invention, expanded clearance portion 131 is provided by processing cylindrical hole portion 116 such that its inner diameter broadens toward the bottom dead point. Therefore, a dimension of clearance between piston 119 and cylindrical hole portion 116 can be matched to the outer diameter of piston 119. This facilitates gaining of reliably high efficiency and good productivity.

Still more, in the first exemplary embodiment, the groove width of first oil groove 121a, which has smaller groove volume, is set to 100 micro meter. Therefore, the oil groove can be processed using general cutting work. This facilitates processing and also suppresses variations in the groove shape. The present invention can thus offer an inexpensive highly-efficient hermetic compressor.

When piston 119 is at near the top dead point, either first oil groove 121a or second oil groove 121b may be located at uniform clearance portion 130.

The first exemplary embodiment of the present invention refers to the case of forming two oil grooves. However, it is apparent that two or more grooves may be created as long as one of the grooves satisfies the scope of claims of the present invention to achieved the same effect.

Example 2

Figure 9:
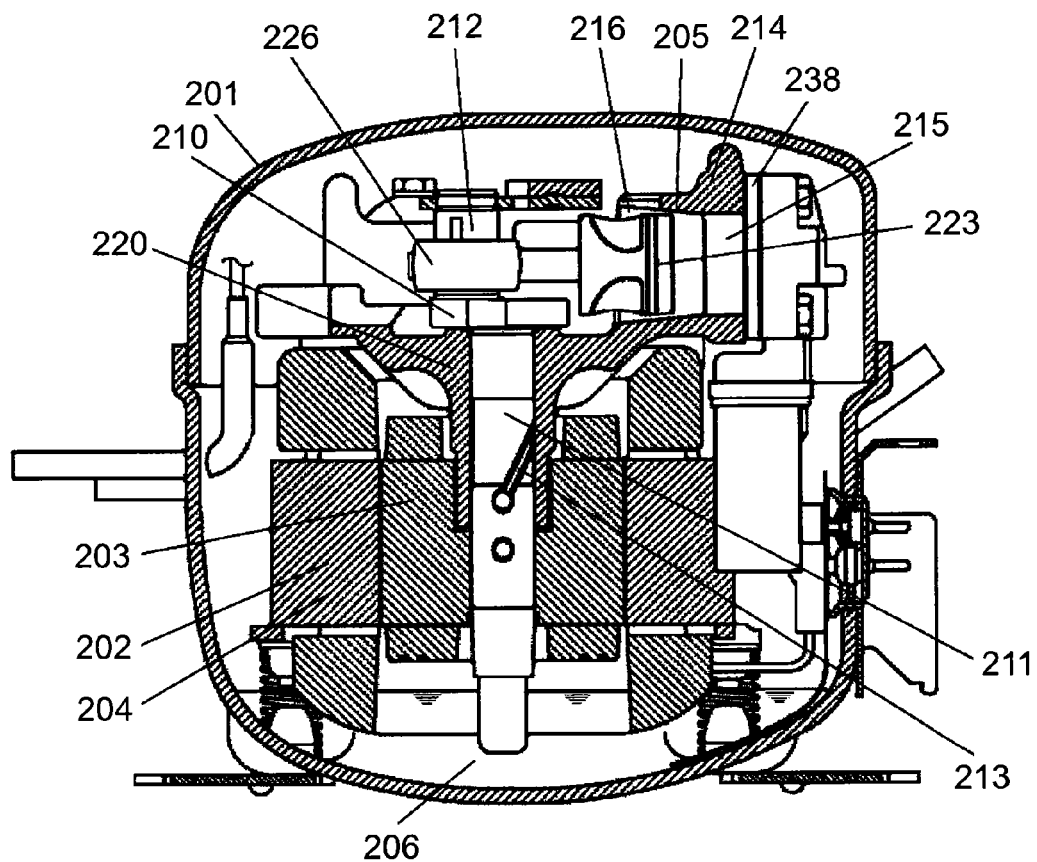
FIG. 9 is a sectional view of a piston at a bottom dead point in a hermetic compressor in accordance with a second exemplary embodiment of the present invention.
Figure 10:
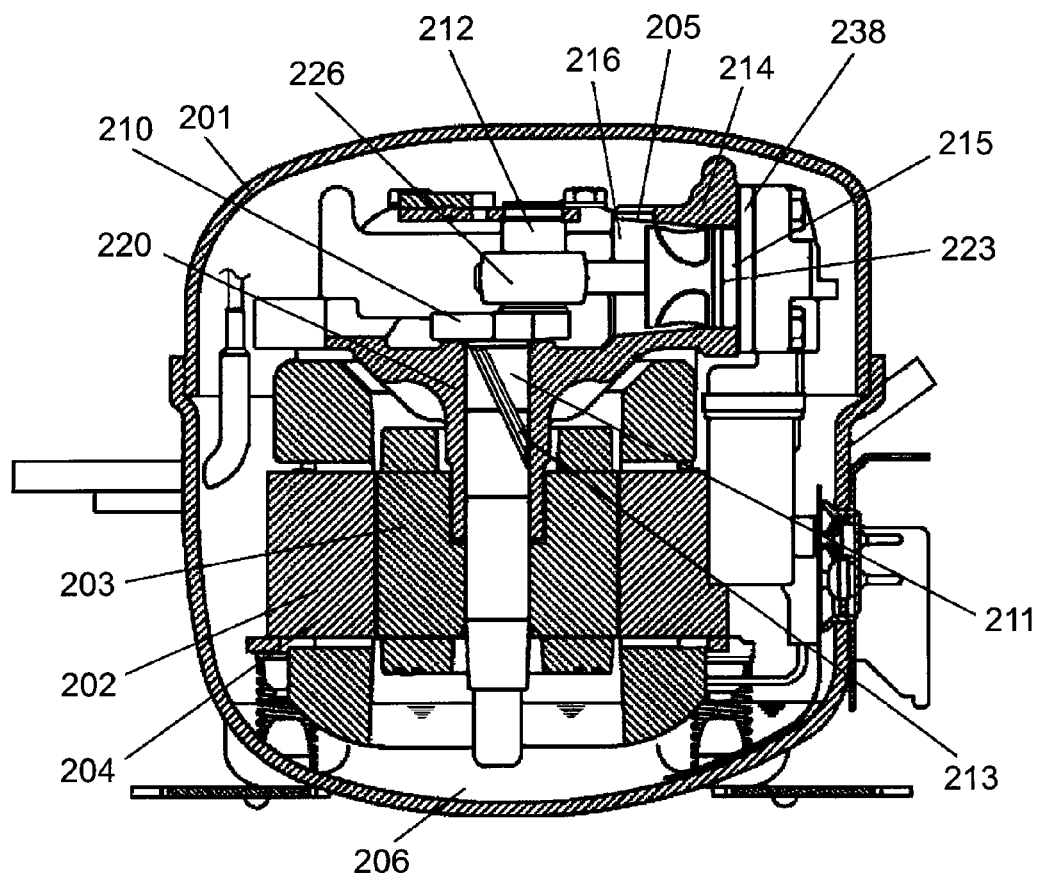
FIG. 10 is a sectional view of the piston at the top dead point in the hermetic compressor.

FIG. 9 is a sectional view of a hermetic compressor in the second exemplary embodiment of the present invention in a state that a piston is at a bottom dead point. FIG. 10 is a sectional view of the hermetic compressor in a state that the piston is at a top dead point.

The hermetic compressor includes electric-driving element 204 and compressing element 205 in closed-vessel 201. Lubricating oil 206 is stored at the bottom of closed vessel 201. Electric-driving element 204 includes stator 202 and rotor 203. Compressing element 205 is driven by electric-driving element 204. Compressing element 205 includes shaft 210, cylinder block 214, piston 223, and connecting device 226.

Shaft 210 includes main shaft 211 and eccentric shaft 212. Main shaft 211 is fixed to a shaft center of rotor 203. Eccentric shaft 212 is formed on one end of main shaft 211 in an eccentric manner so as to integrally move with main shaft 211. Electric-driving element 204 rotates main shaft 211.

Cylinder block 214 includes cylindrical hole portion 216 and bearing 220. Cylindrical hole portion 216 is substantially tubular. Cylindrical hole portion 216 and bearing 220 are fixed at a predetermined position to each other. Cylindrical hole portion 216 is created at a part corresponding to a top end of piston 223 to the side of compression chamber 215 when piston 223 is located at the top dead point.

Piston 223 is inserted into cylindrical hole portion 216 in a reciprocating manner. Bearing 220 supports the end of main shaft 211 of shaft 210 to the side of eccentric shaft 212 so as to form a cantilever bearing. In other words, bearing 220 supports main shaft 211.

Figure 11:
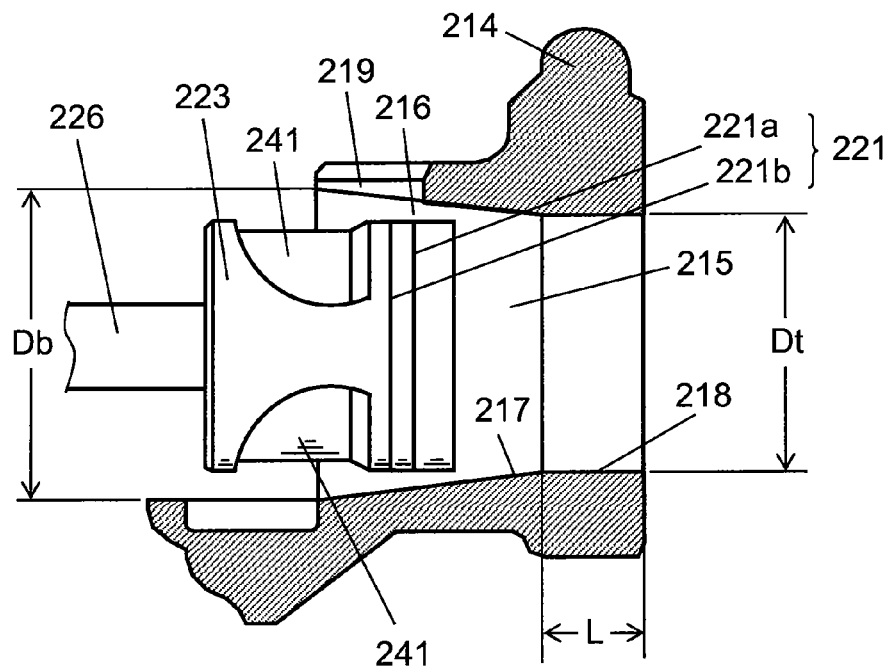
FIG. 11 is a magnified sectional view of a compressor unit in which the piston is at the bottom dead point in the hermetic compressor.
Figure 12:
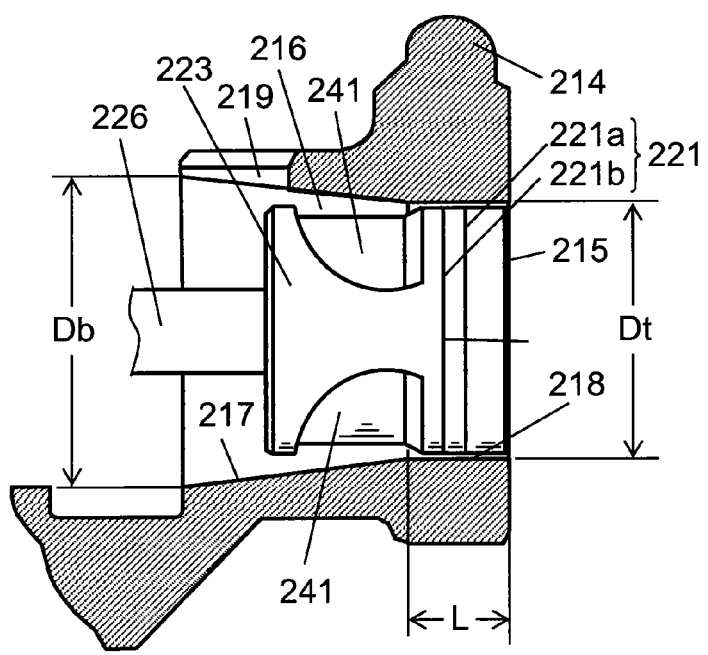
FIG. 12 is a magnified sectional view of a compressor unit in which the piston is at the top dead point in the hermetic compressor.

FIG. 11 is a magnified sectional view of a compressor unit of the hermetic compressor in the second exemplary embodiment of the present invention when the piston is located at the bottom dead point. FIG. 12 is a magnified sectional view of the compressor unit of the hermetic compressor when the piston is located at the top dead point.

One end of connecting device 226 is connected to eccentric shaft 212, and the other end is connected to piston 223 via a piston pin. The piston pin is not illustrated in FIGS. 9 to 12.

Oil passage 213 is provided inside and on the outer circumference of shaft 210. An oil passage (not illustrated) is provided inside eccentric shaft 212 at the end of oil passage 213 to the side of eccentric shaft 212. An end of main shaft 211 to the opposite side of eccentric shaft 212, i.e., the bottom end, extends to lubricating oil 206 so that lubricating oil 206 enters oil passage 213 for a predetermined depth.

Cylindrical hole portion 216 is provided on cylinder block 214 so as to form compression chamber 215 together with piston 223 and valve plate 238. Cylindrical hole portion 216 includes expanded clearance portion 217 and uniform clearance portion 218. Piston 223 has the same outer diameter over its entire length.

At uniform clearance portion 218, the inner diameter of cylindrical hole portion 216 is constant in the axial direction of piston 223. At expanded clearance portion 217, the inner diameter increases from Dt to Db (>Dt) from the position that piston 223 is at the top dead point, as shown in FIG. 12, to the side of the bottom dead point, as shown in FIG. 11. Uniform clearance portion 218 has the constant inner diameter in the axial direction for length L at a position corresponding to an end of piston 223 reaching the top dead point to the side of compression chamber 215.

As shown in FIG. 11, cylinder block 214 has notched upper wall 219. This is to expose the bottom end of piston 223 to the opposite side of compression chamber 215 when piston 223 is at the bottom dead point. Upper wall 219 is a part of circumferential wall of cylindrical hole portion 216.

Concave portions 241 recessed inward in the radial direction of piston 223 are provided on the outer circumference of piston 223 exposed from cylinder block 214 such that they are on opposite sides at 180 degree apart. In other words, at least a part of concave portions 241 is exposed from cylinder block 214 when piston 223 is at the bottom dead point.

Multiple oil grooves 221 are provided on the outer circumference of piston 223. First oil groove 221a is concavely formed on the outer circumference of piston 223 to the side of compression chamber 215 relative to concave portion 241. Second oil groove 221b having the spatial volume same or larger than that of first oil groove 221a is concavely formed to the side of concave portion 241 relative to first oil groove 221a. This enables suppression of reexpansion loss at a low level, which is caused by the refrigerant gas flowing into first oil groove 221a after lubricating oil 206 is carried out.

As shown in FIG. 12, the entire concave portions 241 are located inside cylindrical hole portion 216 when piston 223 reaches near the top dead point. In other words, cylinder block 214 is formed at a position to house entire concave portions 241 inside compression chamber 215 when piston 223 is at near the top dead point. In addition, an end of each of concave portions 241 to the side of compression chamber 215 extends to the position facing uniform clearance portion 218 of cylindrical hole portion 216.

Figure 13A:
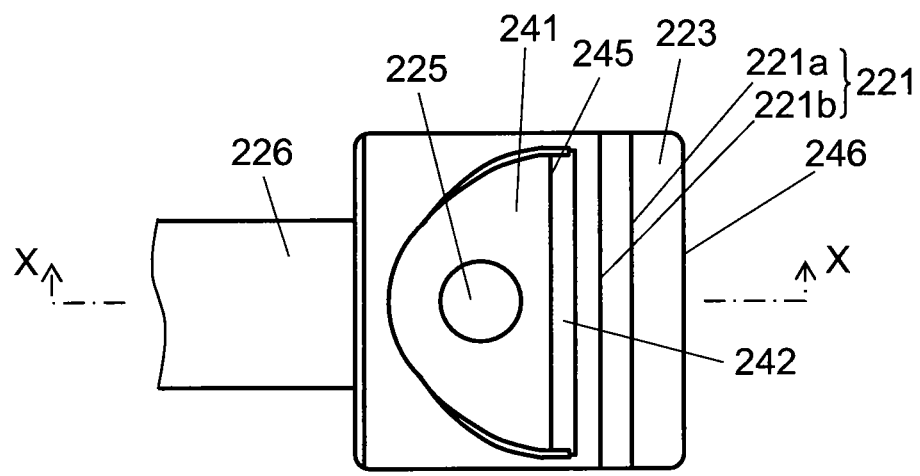
FIG. 13A is a plan view illustrating an outer shape of the piston in the hermetic compressor in accordance with the second exemplary embodiment of the present invention.
Figure 13B:
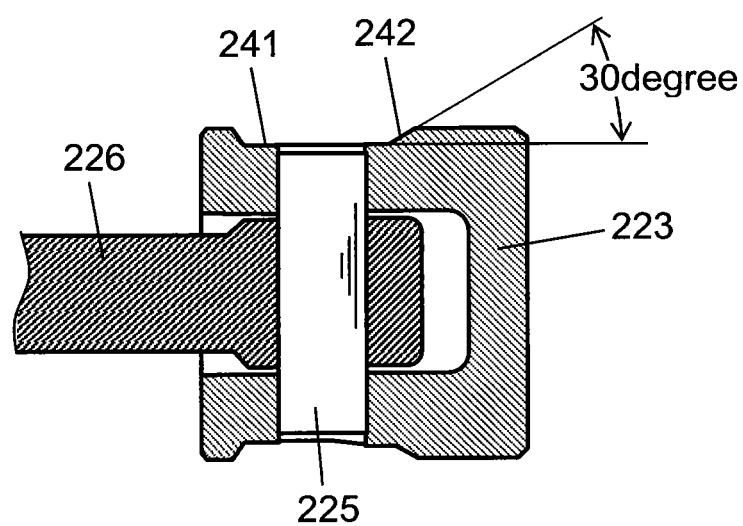
FIG. 13B is a sectional view taken along line X-X in FIG. 13A.

FIG. 13A is a plan view of an outline of the piston of the hermetic compressor in the second exemplary embodiment of the present invention. FIG. 13B is a sectional view taken along line X-X in FIG. 13A. As shown in FIG. 13A, concave portion 241 has substantially constant depth. Concave portion 241 has a width broadening in the circumferential direction, substantially centering on piston pin 225, from the side where connecting device 226 is connected toward top end 245. In addition, rim 242 of concave portion 241 to the side of top end 245 is substantially parallel to top end face 246 of piston 223 to the side of compression chamber 215 and also straight in the circumferential direction.

As a result, when piston 223 comes close to the top dead point, lubricating oil 206 retained in concave portion 241 can be extensively fed to uniform clearance portion 218. This reduces the sliding loss, and achieves a highly-efficient hermetic compressor.

Rim 242 has a cross-section tilted at about 30 degree. This shape of cross section facilitates carrying of lubricating oil 206 to uniform clearance portion 218.

The operation of the hermetic compressor as configured above is described next. Rotor 203 of electric-driving element 204 rotates shaft 210. The rotation of eccentric shaft 212 is transmitted to piston 223 via connecting device 226. This makes piston 223 reciprocates inside cylindrical hole portion 216. The reciprocating movement of piston 223 makes refrigerant gas sucked from a cooling system (not illustrated) to compression chamber 215. Compressed refrigerant gas is then discharged to the cooling system again.

The bottom end of oil passage 213 acts as a pump by the rotation of shaft 210. By this pumping action, lubricating oil 206 at the bottom of closed vessel 201 is pumped up through oil passage 213. Lubricating oil 206 is dispersed horizontally to the entire circumference inside closed vessel 201 from the top end of shaft 210. Lubricating oil 206 is supplied to piston pins 225 and piston 223, as shown in FIGS. 13A and 13B, for lubrication.

In a compression stroke for compressing refrigerant gas, pressure inside compression chamber 215 does not increase so much from the bottom dead point shown in FIG. 11 to a midway before moving onto the top dead point shown in FIG. 12. Therefore, the seal effect of lubricating oil 206 mostly prevents occurrence of blowby even if a clearance between the outer circumferential face of piston 223 and expanded clearance portion 217 is relatively large. A sliding resistance of piston 223 is also relatively small.

As the compression stroke further advances, the pressure of refrigerant gas inside compression chamber 215 gradually increases, and pressure inside compression chamber 215 increases immediately before piston 223 reaches near the top dead point shown in FIG. 12. However, since the clearance between the outer circumferential face of piston 223 and expanded clearance portion 217 reduces toward the top dead point, occurrence of blowby can be reduced. Uniform clearance portion 218 acts to reduce leakage of refrigerant gas whose pressure is increased to a predetermined discharge pressure, compared to the case of tapering uniform clearance portion 218.

In a state that piston 223 is at the bottom dead point, piston 223 to the side of connecting device 226 is designed such that it is exposed from cylinder block 214. Therefore, lubricating oil 206 dispersed from the top end of shaft 210 is sufficiently fed to and retained in concave portions 241 formed on the outer circumferential face of piston 223.

This also increases the amount of lubricating oil 206 fed to a clearance between the inner circumferential face of cylindrical hole portion 216 of cylinder block 214 and the outer circumferential face of piston 223 in the compression stroke. Then, in a state that piston 223 reaches near the top dead point, lubricating oil 206 retained in concave portion 241 becomes difficult to escape from cylindrical hole portion 216 because entire piston 223 is positioned inside cylindrical hole portion 216.

In addition, an end of concave portion 241 to the side of compression chamber 215 is extended to a position facing uniform clearance portion 218 of cylindrical hole portion 216. This encourages feeding of lubricating oil 206 to uniform clearance portion 218 where the sliding resistance becomes the largest.

In this case, a width of concave portion 241 broadens in the circumferential direction, substantially centering on piston pin 225, from the end connected to connecting device 226 to the end to the side of compression chamber 215. Rim 242 to the side of compression chamber 215 is formed linearly in the circumferential direction. Still more, since rim 242 has a cross-sectional shape tilted at substantially 30 degree, an amount of lubricating oil 206 retained in concave portion 241 and fed to a sliding portion between piston 223 and uniform clearance portion 218 can be increased.

As a result, more lubricating oil 206 can be supplied between cylinder block 214 and piston 223. In addition, since lubricating oil 206 is retained in good condition and the sliding resistance can be reduced in a state that piston 223 is near the top dead point, high efficiency is achievable.

Next, how high the percentage of improvement in efficiency of the hermetic compressor in the second exemplary embodiment, compared to a standard hermetic compressor based on the prior art, is described.

Figure 14A:
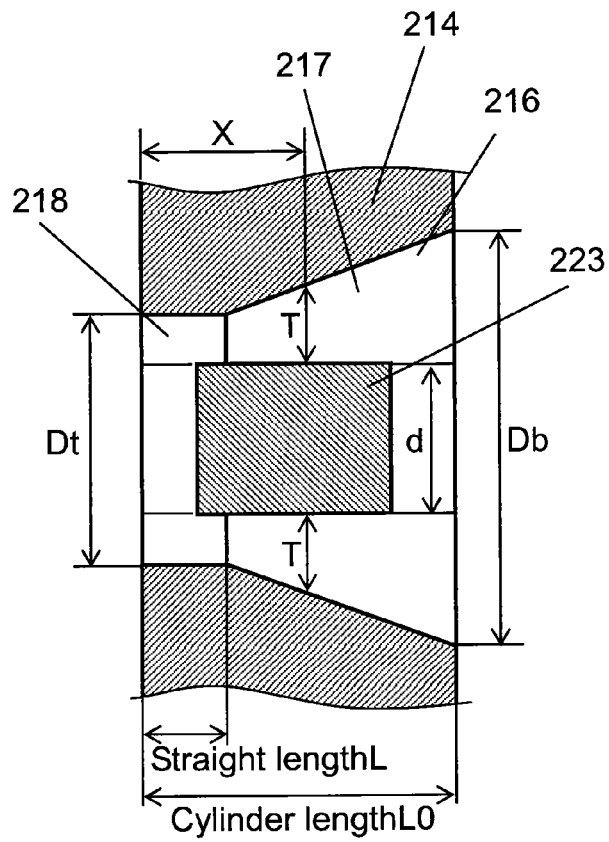
FIG. 14A is a sectional view of a cylinder block and a piston in accordance with the second exemplary embodiment of the present invention.
Figure 14B:
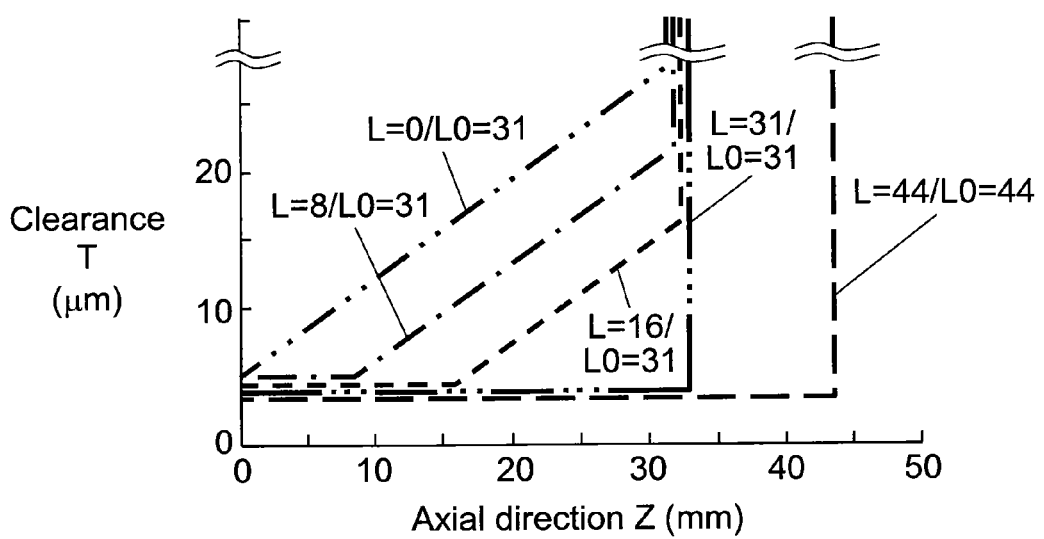
FIG. 14B illustrates logical improvement in efficiency of the hermetic compressor.
Figure 15:
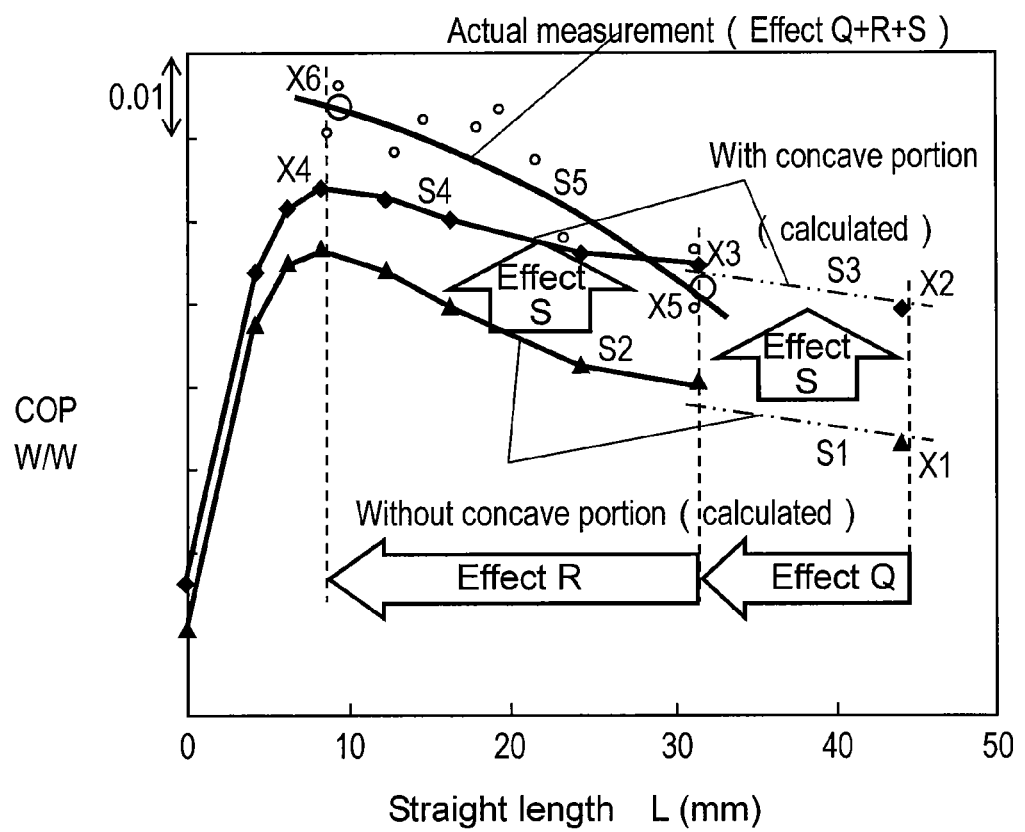
FIG. 15 illustrates an effect of improving efficiency of the hermetic compressor.

FIG. 14A is a sectional view of a cylinder block and piston in the second exemplary embodiment of the present invention. FIG. 14B logically illustrates improvement in efficiency of the hermetic compressor. FIG. 15 illustrates the effect of improvement in efficiency of the hermetic compressor. More specifically, FIG. 15 illustrates the relationship between the straight length of cylinder block 214 and efficiency (COP).

As shown in FIG. 14A, the compressor unit of the hermetic compressor in the second exemplary embodiment of the present invention includes cylinder block 214 having uniform clearance portion 218 with constant inner diameter in the axial direction and, expanded clearance portion 217 with broadening inner diameter adjacent to it, and piston 223 with constant outer diameter.

Let's say, uniform clearance portion 218 of cylinder block 214 has inner diameter Dt (=inner diameter to the side of small diameter of expanded clearance portion 217), expanded clearance portion 217 has inner diameter Db to the side of large diameter, piston 223 has outer diameter d, uniform clearance portion 218 has straight length L, i.e., axial length; and cylinder block 214 has cylinder block length L0, i.e. axial length. Actual equipment for installing cylinder block 214 with cylinder block length L0 of 31 mm is used. Then, multiple types of cylinder blocks 214 with straight length L varying from 0 mm to 31 mm are prepared, and these cylinder blocks 214 are built in so as to measure efficiency, respectively.

Cylinder block 214 with cylinder block length L0 of 31 mm and straight length L of 31 mm means that entire cylinder block 214 is straight without any expanded clearance portion.

The next two types of cylinder blocks 214 of the hermetic compressor are computationally predicted. The first type is several cylinder blocks 214 with cylinder block length L0 of 31 mm and different straight lengths L varying from 0 mm to 31 mm. The second type is cylinder block 214 with cylinder block length L0 of 44 mm and straight length L of 44 mm, i.e., cylinder block 214 without expanded clearance portion.

In addition, in cylinder block 214 with cylinder block length 44 mm, piston 223 is not exposed from cylinder block 214 even when piston 223 is at the bottom dead point. If a radial clearance when piston 223 is inserted into each of these cylinder blocks 214 is the same as that in the actual equipment, the relationship between axial position P of cylinder block 214 and clearance delta T will be the same as that shown in FIG. 14B.

Axial position P is a position spaced apart toward the bottom dead point with respect to the end of cylinder block 214 to the side of top dead point. Clearance delta T is a value defined by the following Formula 1.

$$\text{delta } T = \{(Dt - Db) - d\}/2 \qquad \text{Formula 1}$$

Clearance delta T is expressed as a linear function of position P, and this relation is used for calculating the efficiency. For example, FIG. 14B gives characteristic of a clearance against cylinder block 214 with cylinder block length L0 of 31 mm when straight length L is 0, 4, 8, 16, 24, or 31 mm. On the assumption that each of these cylinder blocks 214 is assembled in the same way as actual equipment, the efficiency of hermetic compressor is calculated.

In calculation of the efficiency of the hermetic compressor, the efficiency is calculated separately for piston 223 with concave portion 241 for retaining lubricating oil 206 on its outer circumferential face (with concave portion) and piston 223 without concave portion. In the above-described cylinder blocks 214, cylinder block 214 with cylinder block length of 44 mm is the type that its entire concave portion 241 hides inside cylinder block 214 in a state that piston 223 is at the bottom dead point. Cylinder block 214 with cylinder block length of 31 mm is the type that most of concave portion 241 is exposed from cylinder block 214 in a state that piston 223 is at the bottom dead point.

Here, the next values are plotted for curve approximation using a predetermined formula:

(1) Calculated efficiency of hermetic compressor including combinations of cylinder block 214 with different cylinder block lengths L0 and straight lengths L, and piston 223 without concave portion.

(2) Calculated efficiency of hermetic compressor including cylinder block 214 with different cylinder block lengths L0 and straight lengths L, and piston 223 with concave portion 241.

(3) Actually measured efficiency of hermetic compressor including cylinder block 214 with different straight lengths L, and piston 223 with concave portion 241.

FIG. 15 is a graph illustrating the above efficiency characteristic (a chart explaining the effect of improvement in efficiency).

In FIG. 15, point X1 shows the calculated efficiency when cylinder block 214 with cylinder block length L0 of 44 mm and straight length L of 44 mm, i.e., cylinder block 214 without expanded clearance portion, is combined with piston 223 without concave portion. Then, if only cylinder block length L0 of cylinder block 214 is shortened up to 31 mm sequentially, the efficiency increases, as shown by curve S1, in line with reduction of sliding resistance between cylinder block 214 and piston 223.

Next, curve S2 shows the calculated efficiency when cylinder block 214 with cylinder block length L0 of 31 mm and straight length L varying from 31 mm to 0 mm in 8 variations is combined with piston 223 without concave portion. As shown by curve S2, the efficiency increases as straight length L becomes shorter than 31 mm, and the efficiency becomes the maximum when straight length L becomes about 8.3 mm. Then, efficiency suddenly drops as straight length L becomes close to 0.

Next, point X2 in FIG. 15 shows the calculated efficiency when cylinder block 214 with cylinder block length L0 of 44 mm and straight length L of 44 mm, i.e., cylinder block 214 without expanded clearance portion, is combined with piston 223 with concave portion 241. If only cylinder block length L0 of this cylinder block 214 is shortened up to 31 mm sequentially, the efficiency increases up to point X3, as shown by curve S3, in line with reduction of the sliding resistance between cylinder block 214 and piston 223.

Next, curve S4 shows the calculated efficiency when cylinder block 214 with cylinder block length L0 of 31 mm and straight length L varying from 31 mm to 0 mm in 8 variations is combined with piston 223 with concave portion. As shown by curve S4, the efficiency increases as straight length L becomes shorter than 31 mm, and the efficiency becomes the maximum when straight length L is about 8.3 mm. Then, the efficiency suddenly drops as straight length L comes close to zero. Point X4 indicates the position of the highest efficiency.

An increase in the efficiency from point X2 to point X3 as described above is gained by the effect of exposing piston 223 (effect Q). An increase in the efficiency from around point X3 to the maximum point X4 is gained by the effect of providing uniform clearance portion 218 and expanded clearance portion 217 to cylinder block 214 (effect R). It is also predictable that an increase in the efficiency from curve S1 to curve S3 or curve S2 to curve S4 is the effect of providing concave portion 241 to piston 223 (effect S).

Curve S5 indicates the actually-measured efficiency when cylinder block 214 with cylinder block length L0 of 31 mm and straight length varying from 31 mm to about 8.3 mm in 5 variations is combined with piston 223 with concave portion 241. As shown by curve S5, the efficiency increases as straight length L becomes shorter than 31 mm. Point X5 shows the efficiency when straight length L is 31 mm. Point X6 shows the efficiency when straight length L is about 8.3 mm. In comparison of point X6 and point X4, their relation is point X6>point X4.

If above effect Q by exposing piston 223, effect R by providing uniform clearance portion 218 and expanded clearance portion 217 to cylinder block 214, and effect S by providing concave portion 241 to piston 223 are quantified by respective COP, results will be as follows.

Effect Q by exposing piston 223: about +0.006

Effect R by providing uniform clearance portion 218 and expanded clearance portion 217 to cylinder block 214: about +0.009

Effect S by providing concave portion 241 to piston 223: about +0.015

The total increase in these efficiencies is about +0.03 in COP, which is equivalent to an increase from point X1 to point X4. On the other hand, the actually-measured efficiency when straight length L is about 8.3 mm is greater than the calculated efficiency. An increase from point X1 to point X6 is about +0.04 in COP, and thus the effect of improvement in efficiency over 30% is achieved, compared to an increase based on calculated efficiency.

It is apparent from the above that the following three technologies contribute to improvement of efficiency, respectively. The efficiency improvement effect gained by combining these three technologies is markedly greater than the predicted efficiency improvement effect of individual technology. These three technologies are a technology of exposing piston 223 from cylinder block 214, a technology of adopting cylinder block 214 with uniform clearance portion 218 and expanded clearance portion 217, and a technology of adopting piston 223 with concave portion 241.

In other words, it can be concluded that the hermetic compressor in the second exemplary embodiment of the present invention achieves markedly higher rate of improvement in efficiency, compared to a standard hermetic compressor based on the prior art.

Figure 16:
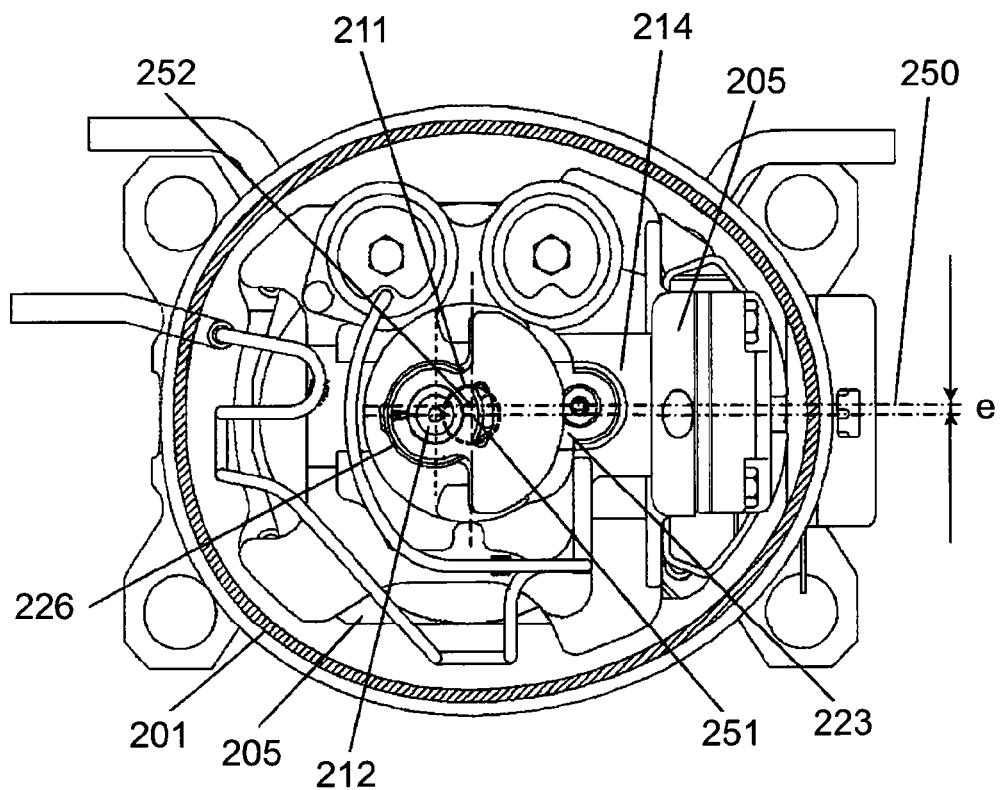
FIG. 16 is a top sectional view illustrating a positional relationship of a bearing and a compression chamber of the hermetic compressor.
Figure 17:
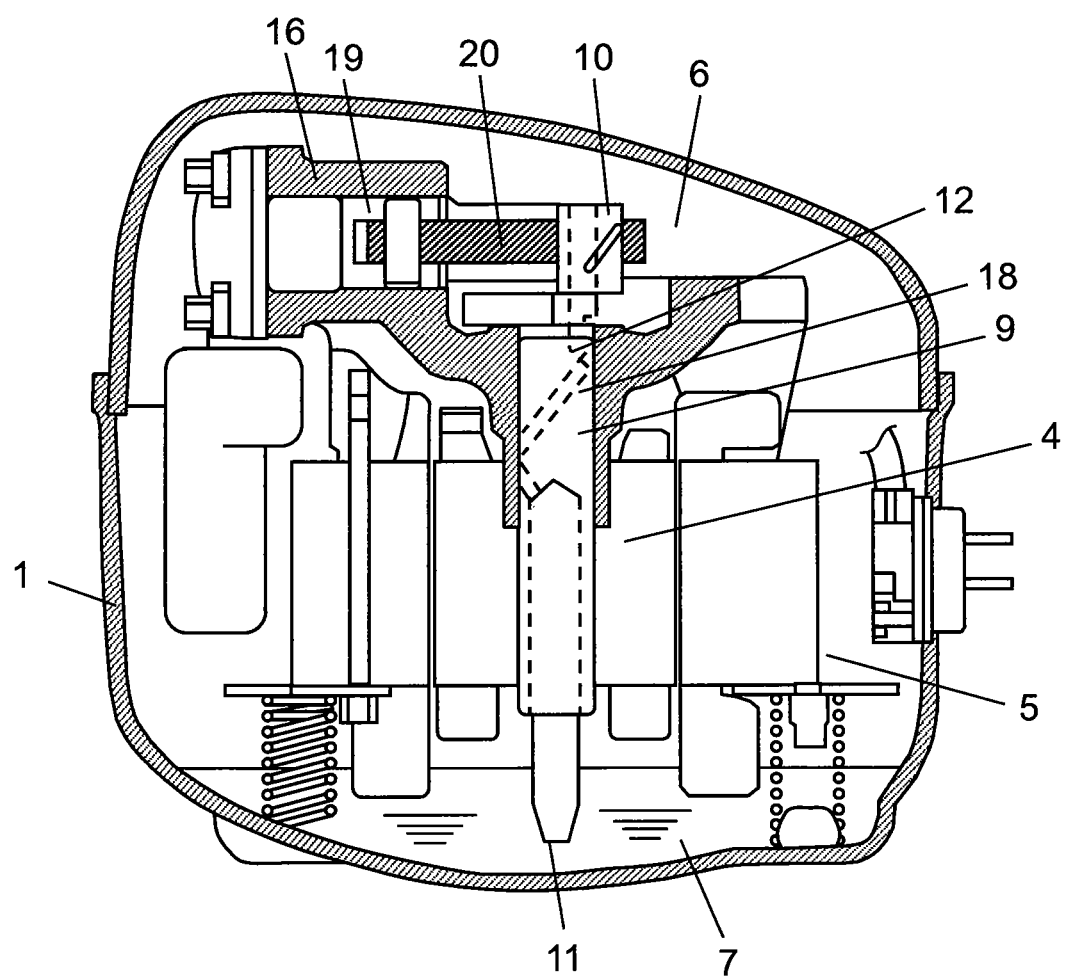
FIG. 17 is a vertical sectional view of a conventional hermetic compressor disclosed in PTL1.
Figure 18:
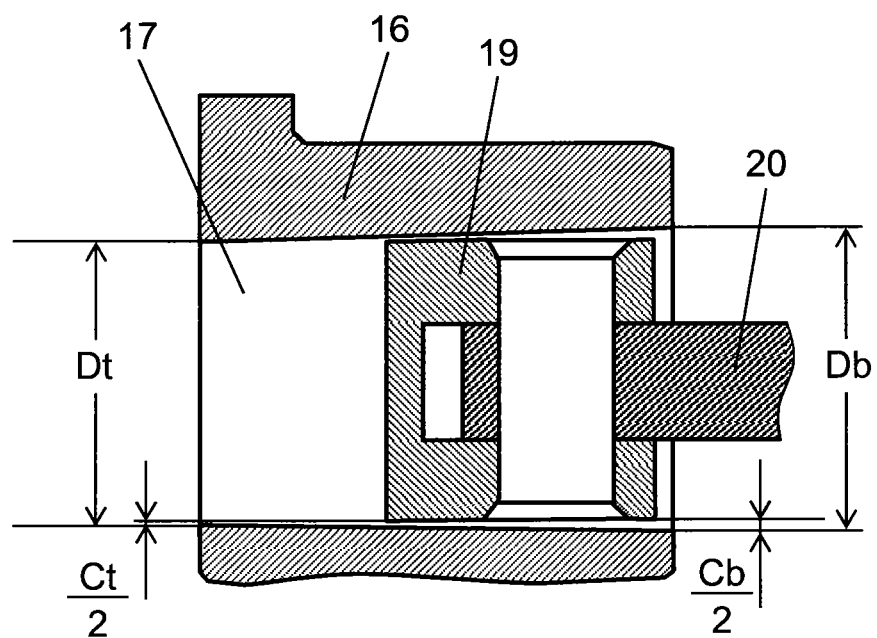
FIG. 18 is a sectional view of a key part around the piston of the hermetic compressor.
Figure 19:
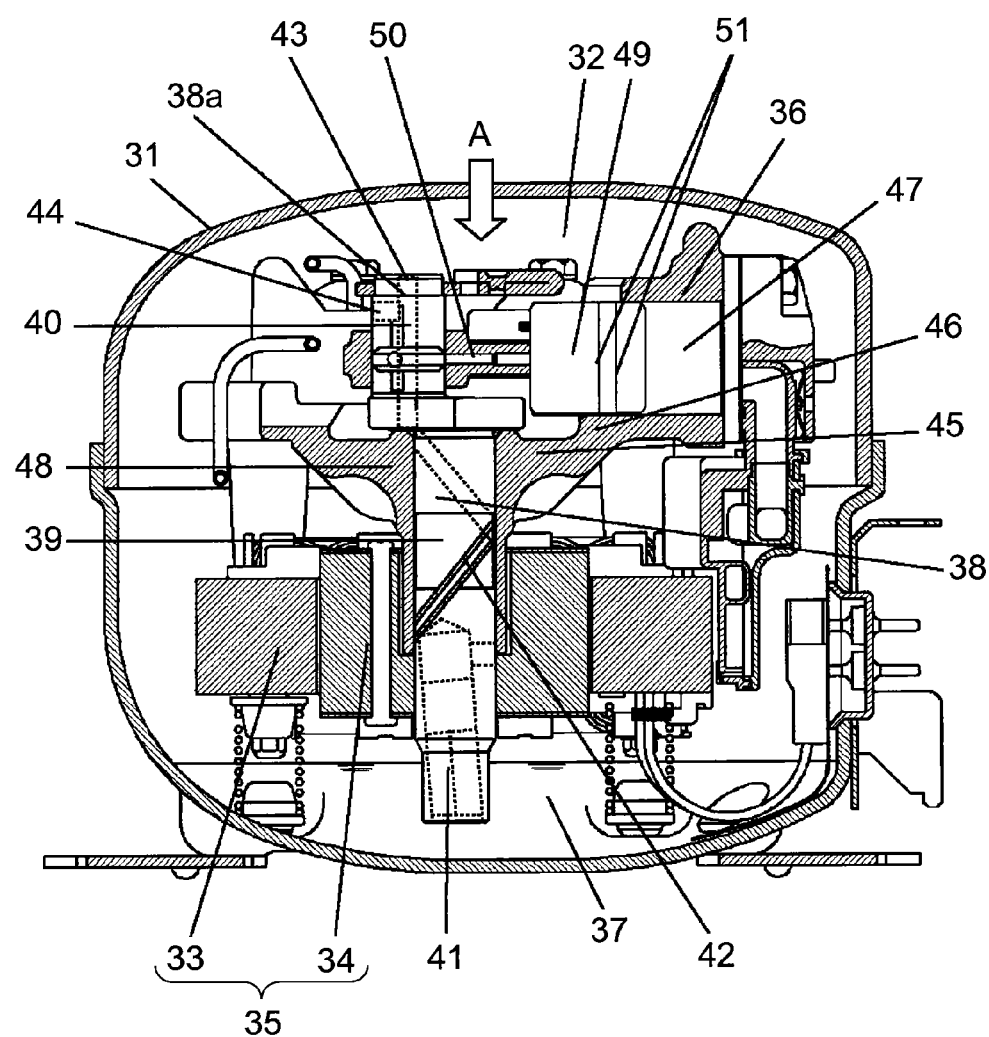
FIG. 19 is a vertical sectional view of a conventional hermetic compressor disclosed in PTL2.
Figure 20:
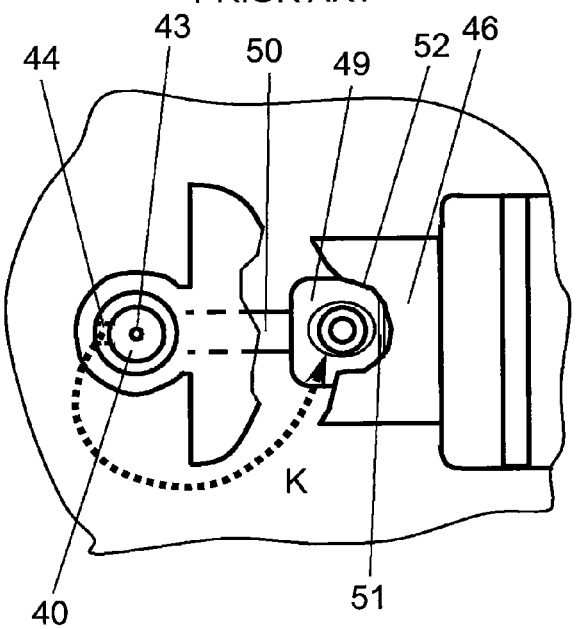
FIG. 20 is a view seen for a direction of arrow A in FIG. 19.
Figure 21:
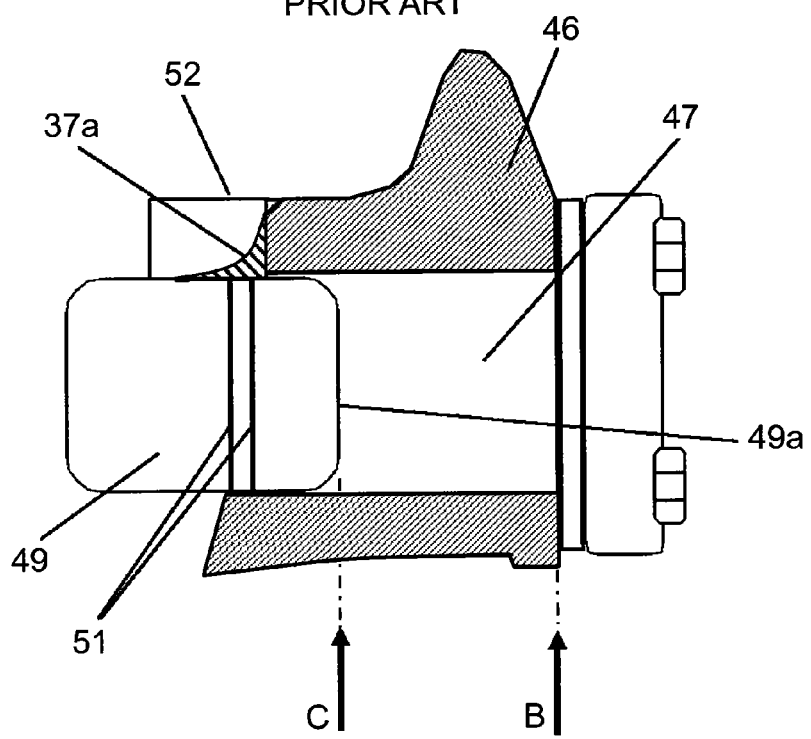
FIG. 21 is a sectional view of a key part around the piston of the conventional hermetic compressor disclosed in PTL2.
Figure 22:
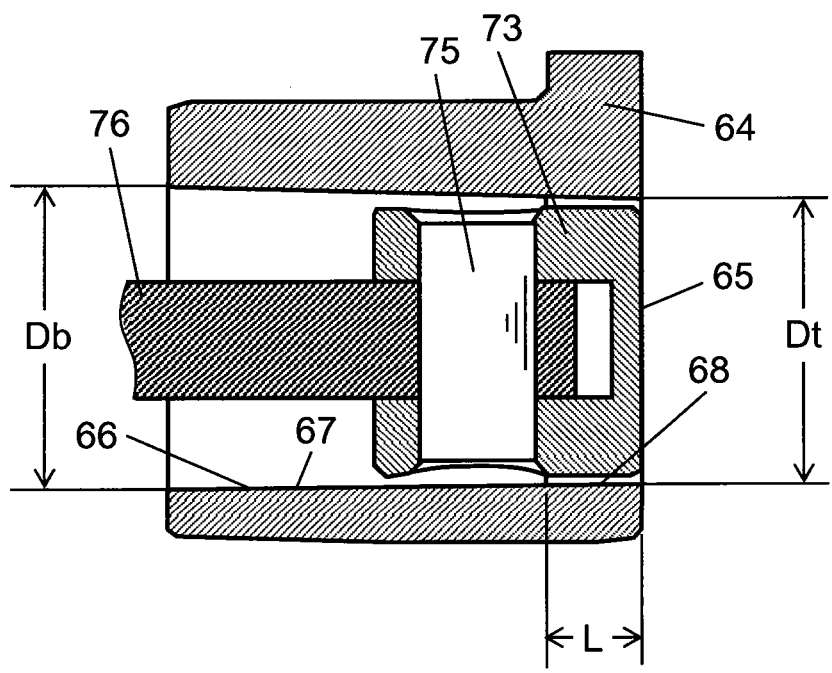
FIG. 22 is a sectional view of a compressor unit in which refrigerant can be compressed disclosed in PTL3.

In the above description, the axis center of cylindrical hole portion 216 and the axis center of bearing 220 do not cross perpendicularly, and an offset structure is adopted. Details of the structure is described with reference to FIG. 16. FIG. 16 is a top sectional view illustrating the positional relationship of the bearing and the compression chamber of the hermetic compressor in the second exemplary embodiment.

With respect to center line 250, center line 251 (a point in the drawing) is deviated in parallel for length e. Center line 250 indicates the axis center of cylindrical hole portion 216. Center line 251 indicates the axis center of bearing 220. Center line 252 deviated in parallel from center line 251 for length e is perpendicular to center line 250 of cylindrical hole portion 216. This is generally called the offset structure.

Details of experiment results are not given here, but the same results as test results shown in FIG. 15 are achieved when offset (length e) is between 0 mm and 3 mm. Accordingly, a high rate of improvement in efficiency described above is achieved regardless of offset.

First oil groove 221a or second oil groove 221b may be located at uniform clearance portion 218 when piston 223 is close to the top dead point. As a result, lubricating oil 206 is reliably supplied to uniform clearance portion 218 where the clearance becomes the narrowest between piston 223 and cylindrical hole portion 216. This maintains smooth sliding, and also suppresses leakage of refrigerant gas. Accordingly, the efficiency of hermetic compressor can be further increased.

Still more, the sum of spatial volumes of first oil groove 221a and second oil groove 221b may be 0.5 or more to 2.0 or less times the total spatial volume of the clearance between piston 223 and cylindrical hole portion 216. As a result, sufficient amount of lubricating oil 206 is supplied to the spatial volume of the clearance between piston 223 and cylindrical hole portion 216 so as to suppress leakage of refrigerant. In addition, a dead volume remaining after the lubricating oil in first oil groove 221a and second oil groove 221b is carried out is minimized so as to reduce the reexpansion loss. Accordingly, the efficiency of the hermetic compressor can be further increased.

Still more, the spatial volume of second oil groove 221b may be set to 4 or more to 20 or less times the spatial volume of first oil groove 221a. A volume ratio of first oil groove 221a to second oil groove 221b is determined according to a volume ratio of the two spatial volumes described below. This enables balanced feeding of lubricating oil 206 to the oil-seal distance formed by the clearance between piston 223 and cylindrical hole portion 216 continuing form first oil groove 221a and second oil groove 221b toward the bottom dead point. As a result, the efficiency of the hermetic compressor can be further increased. One of the above-mentioned two spatial volumes is a spatial volume of a clearance between piston 223 and cylindrical hole portion 216 for a distance from first oil groove 221a to second oil groove 221b. The other one in the two spatial volumes is a spatial volume of a clearance between piston 223 and cylindrical hole portion 216 for a distance from second oil groove 221b to the bottom end of piston 223.

Still more, the sum of the spatial volumes of first oil supply 221a and second oil supply groove 221b may be the total spatial volume of the clearance between piston 223 and cylindrical hole portion 216 of 10 mm$^3$ or more to 35 mm$^3$ or less. If the sum of spatial volumes of first oil groove 221a and second oil groove 221b is less than 10 mm$^3$, the COP drops and variations in COP increases. If the sum of spatial volumes of first oil groove 221a and second oil groove 221b exceeds 35 mm$^3$, the sum of spatial volumes of first oil groove 221a and second oil groove 221b is too large, compared to the spatial volume of the clearance between piston 223 and cylindrical hole portion 216. In this case, reexpasion loss due to the refrigerant gas, leaked between piston 223 and cylindrical hole portion 216 from compression chamber 215, flowing into first oil groove 221a after lubricating oil 206 is carried out from first oil groove 221a becomes too large although amount of lubricating oil 206 supplied to the clearance is sufficient.

Furthermore, first oil groove 221a and second oil groove 221b may be disposed with a distance of 1 mm or more or 4 mm or less apart. This secures the oil-seal distance by lubricating oil 206 carried out from first oil groove 221a so as to reduce the amount of refrigerant gas reaching second oil groove 221b. Then, lubricating oil 206 stored in second oil groove 221b is carried out between piston 223 and cylindrical hole portion 216 in the same way as first oil groove 221a. However, continuous feeding of lubricating oil 206 from first oil groove 221a can maintain the oil seal on the outer circumference of piston 223 from second oil groove 221b to the bottom end face of piston 223.

INDUSTRIAL APPLICABILITY

As described above, the hermetic compressor of the present invention increases the sealing effect by improving the retention of oil on the outer circumference of piston so as to offer a highly-efficient hermetic compressor. This is applicable to household refrigerator-freezers and also to other purposes involving freezing cycles, including vending machines and showcases. Furthermore, the present invention is applicable to linear compressors adopting a similar piston structure.

REFERENCE SIGNS LIST 101, 201 Closed vessel
105, 204 Electric-driving element
106, 205 Compressing element
107, 206 Lubricating oil
108a Oiling device
115, 214 Cylinder block
116, 216 Cylindrical hole portion
117, 215 Compression chamber
119, 223 Piston
121a First oil groove
121b Second oil groove
122 Notched portion
130, 218 Uniform clearance portion
131, 217 Expanded clearance portion
210 Shaft
211 Main shaft
212 Eccentric shaft
220 Bearing
226 Connecting device
241 Concave portion
242 Rim

What is claimed is:

1. A hermetic compressor comprising:
a closed vessel storing lubricating oil;
an electric-driving element; and
a compressing element driven by the electric-driving element, the compressing element including:
   a cylinder block having a cylindrical hole portion for forming a compression chamber;
   a piston that reciprocates in the cylindrical hole portion; and
   an oiling device for feeding the lubricating oil to an outer circumference of the piston;
wherein a first oil groove is concavely formed on the outer circumference of the piston, and a second oil groove is concavely formed adjacent the first oil groove away from the compression chamber relative to the first oil groove, the second oil groove having a spatial volume not less than that of the first oil groove,
wherein a uniform clearance portion where a clearance between the piston and the cylindrical hole portion is constant is provided in the cylindrical hole portion, so that the first oil groove is located at the uniform clearance portion when the piston is close to a top dead point, and an expanded clearance portion is provided to a side of the bottom dead end point relative to the uniform clearance portion, the expanded clearance portion being adjacent to the uniform clearance portion and broadening the clearance toward a bottom dead end point; and
wherein a notched portion is further provided in the expanded clearance portion of the cylindrical hole portion, the first oil groove and the second oil groove being connected to inside the closed vessel via the notched portion when the piston is close to the bottom dead point.

2. The hermetic compressor of claim 1,
wherein the notched portion is provided on a top wall of the cylindrical hole portion.

3. The hermetic compressor of claim 2,
wherein the expanded clearance portion is formed by enlarging an inner diameter of the cylindrical hole portion from the top dead point to the bottom dead point, or reducing an outer diameter of the piston from the top dead point to the bottom dead point.

4. The hermetic compressor of claim 1,
wherein the expanded clearance portion is formed by enlarging an inner diameter of the cylindrical hole portion from the top dead point to the bottom dead point, or reducing an outer diameter of the piston from the top dead point to the bottom dead point.

5. The hermetic compressor of claim 1,
wherein the uniform clearance portion is formed by providing a uniform inner diameter of the cylindrical portion in a predetermined range from the top dead point.

6. The hermetic compressor of claim 1,
wherein a sum of a spatial volume of the first oil groove and a spatial volume of the second oil groove is not less than 0.5 times and not greater than 2.0 times a total spatial volume of the clearance between the piston and the cylindrical hole portion from the top dead point to the bottom dead point.

7. The hermetic compressor of claim 1,
wherein the spatial volume of the second oil groove is not less than 4 times and not greater than 20 times the spatial volume of the first oil groove.

8. The hermetic compressor of claim 1,
wherein a sum of spatial volume of the first oil groove and a spatial volume of the second oil groove is not less than 10 mm$^3$ and not greater than 35 mm$^3$ of a total spatial volume of the clearance between the piston and the cylindrical hole portion from the top dead point to the bottom dead point.

9. The hermetic compressor of claim 1,
wherein the first oil groove and the second oil groove are concavely formed with not less than 1-mm distance and not greater than 4-mm distance apart.

10. The hermetic compressor of claim 1, wherein the spatial volume of the second oil groove is greater than the spatial volume of the first oil groove.

11. The hermetic compressor of claim 1, wherein the second groove has an annular shape.

* * * * *